United States Patent
Bard et al.

(10) Patent No.: US 12,516,755 B2
(45) Date of Patent: Jan. 6, 2026

(54) MULTILAYER HOSE AND ASSOCIATED METHOD

(71) Applicant: Response Technologies, LLC, Coventry, RI (US)

(72) Inventors: Edmund Bard, Cumberland, RI (US); David A. Pettey, Portsmouth, RI (US)

(73) Assignee: Response Technologies, LLC, Coventry, RI (US)

( * ) Notice: Subject to any disclaimer, the term of this patent is extended or adjusted under 35 U.S.C. 154(b) by 120 days.

(21) Appl. No.: 18/453,734

(22) Filed: Aug. 22, 2023

(65) Prior Publication Data

US 2023/0392722 A1 Dec. 7, 2023

Related U.S. Application Data

(62) Division of application No. 17/570,115, filed on Jan. 6, 2022, now Pat. No. 11,815,199.

(51) Int. Cl.
| | |
|---|---|
| *B29C 48/10* | (2019.01) |
| *B29C 48/151* | (2019.01) |
| *F16L 11/08* | (2006.01) |
| *F16L 11/12* | (2006.01) |
| *F16L 57/06* | (2006.01) |
| *B29L 23/00* | (2006.01) |

(52) U.S. Cl.
CPC ............ *F16L 11/121* (2013.01); *B29C 48/10* (2019.02); *B29C 48/151* (2019.02); *F16L 11/085* (2013.01); *F16L 57/06* (2013.01); *B29L 2023/005* (2013.01)

(58) Field of Classification Search
CPC ........... B29C 51/02; B32B 1/08; F16L 11/121
See application file for complete search history.

(56) References Cited

U.S. PATENT DOCUMENTS

| | | | |
|---|---|---|---|
| 2,401,627 A | 6/1946 | Eger | |
| 2,504,421 A | 4/1950 | Johnson | |
| 3,581,778 A * | 6/1971 | Korejwa | ............... F16L 11/085 |
| | | | 138/119 |
| 3,698,587 A | 10/1972 | Baker et al. | |
| 3,949,894 A | 4/1976 | Underwood | |
| 3,980,106 A | 9/1976 | Wiggins | |
| 4,088,240 A | 5/1978 | San Miguel | |

(Continued)

FOREIGN PATENT DOCUMENTS

WO 2005021377 A1 3/2005

OTHER PUBLICATIONS

Self-healing thermoplastic elastomeric materials: Challenges, opportunities and new approaches, S Aiswarya, European Polymer Journal, vol. 181, 11658 (Year: 2022).*

*Primary Examiner* — Alison L Hindenlang
*Assistant Examiner* — Debjani Roy
(74) *Attorney, Agent, or Firm* — Slater Matsil, LLP

(57) ABSTRACT

In certain embodiments, a hose includes an inner tube, a filler material, and an outer cover. The inner tube has a cross-sectional shape and includes a cavity for transporting a substance. The filler material is provided around an outer periphery of the inner tube. The filler material includes a self-sealing material or a self-healing material. The outer cover is provided around an outer periphery of the filler material such that the filler material is between the outer cover and the inner tube. The outer cover has a D-shaped cross-sectional shape.

20 Claims, 11 Drawing Sheets

(56) References Cited

U.S. PATENT DOCUMENTS

| | | | |
|---|---|---|---|
| 4,216,803 A | 8/1980 | Hall | |
| 4,368,086 A | 1/1983 | Villemain | |
| 5,858,556 A * | 1/1999 | Eckert | A61F 2/82 |
| | | | 428/685 |
| 7,169,452 B1 | 1/2007 | Monk et al. | |
| 7,794,808 B2 | 9/2010 | Dudt et al. | |
| 9,694,629 B1 | 7/2017 | Dry | |
| 9,770,883 B1 | 9/2017 | Luzetsky | |
| 10,082,372 B1 | 9/2018 | Iliev | |
| 10,471,676 B1 | 11/2019 | Whipple | |
| 10,513,173 B1 | 12/2019 | Misciagna | |
| 2006/0151043 A1* | 7/2006 | Nanney | F16L 11/085 |
| | | | 138/123 |
| 2012/0298660 A1 | 11/2012 | Bongiovanni | |
| 2015/0056391 A1 | 2/2015 | Dry | |
| 2015/0151630 A1 | 6/2015 | Bethea | |
| 2016/0347038 A1 | 12/2016 | Childress | |
| 2017/0057341 A1 | 3/2017 | Wilenski | |
| 2018/0010890 A1 | 1/2018 | Waldrop | |
| 2021/0291486 A1 | 9/2021 | Wagner | |
| 2022/0275885 A1* | 9/2022 | Cegalin | F16L 11/085 |

\* cited by examiner

MULTILAYER HOSE AND ASSOCIATED METHOD

CROSS REFERENCE TO RELATED APPLICATIONS

This application is a divisional of pending U.S. patent application Ser. No. 17/570,115, filed on Jan. 6, 2022, entitled "Multilayer Hose and Associated Method," which application is incorporated by reference herein in its entirety.

TECHNICAL FIELD

This disclosure relates generally to hoses, and, in particular embodiments, to a multilayer hose and associated method.

BACKGROUND

Hoses are prevalent in various applications for transporting a substance from one location to another, such as from one component of a machine to another component of the machine. For example, vehicles such as cars, aircraft, and the like typically include one or more hoses that may be used to transport fluids or gases from one component to another. As a first particular example, a fuel hose may be coupled between a fuel intake aperture and a fuel tank to transport fuel from a fuel source to the fuel tank. As another particular example, a fuel hose may be coupled between a fuel tank and another component, such as a fuel pump, a fuel filter, or the like. As other particular examples, a hose in a vehicle may be used to deliver water or other fluids to appropriate components within the vehicle.

In certain environments (e.g., military applications), for both ground and airborne vehicles, hoses may be at risk of being pierced by projectiles and the like, (e.g., incoming fire, such as bullets, and shrapnel). When such a puncture occurs, the substance being transported by the hose may leak, which may present any number of problems depending on the substance being transported by the hose.

SUMMARY

In certain embodiments, a hose includes an inner tube, a filler material, and an outer cover. The inner tube has a cross-sectional shape and includes a cavity for transporting a substance. The filler material is provided around an outer periphery of the inner tube. The filler material includes a self-sealing material or a self-healing material. The outer cover is provided around an outer periphery of the filler material such that the filler material is between the outer cover and the inner tube. The outer cover has a D-shaped cross-sectional shape.

In certain embodiments, a method for forming a hose includes providing an inner tube comprising a cavity for transporting a substance and forming a filler material into a first cross-sectional shape around an outer periphery of the inner tube. The first cross-sectional shape has at least one elongated edge. The method includes enclosing the filler material in an outer cover such that the filler material is positioned between the outer cover and the inner tube. The outer cover is formed into a shape that matches the first cross-sectional shape of the filler material such that the outer cover has the first cross-sectional shape.

In certain embodiments, a machine includes a surface configured to be oriented toward a potential threat and a hose. The hose includes an inner tube, a filler material, and an outer cover. The inner tube includes a cavity for transporting a substance. The filler material is provided around an outer periphery of the inner tube and includes a self-sealing material or a self-healing material. The outer cover is provided around an outer periphery of the filler material such that the filler material is between the outer cover and the inner tube. The outer cover has a cross-sectional shape that includes at least one flat edge. A thickness of the filler material between the inner tube and the at least one flat edge of the outer cover is less than a thickness of the filler material between the inner tube and at least one other edge of the outer cover. The at least one flat edge is positioned toward a portion of the surface such that a greater amount of filler material is configured to be oriented toward the potential threat.

BRIEF DESCRIPTION OF THE DRAWINGS

For a more complete understanding of this disclosure, and the advantages thereof, reference is now made to the following descriptions taken in conjunction with the accompanying drawings, in which.

DETAILED DESCRIPTION OF ILLUSTRATIVE EMBODIMENTS

Figure 1A:
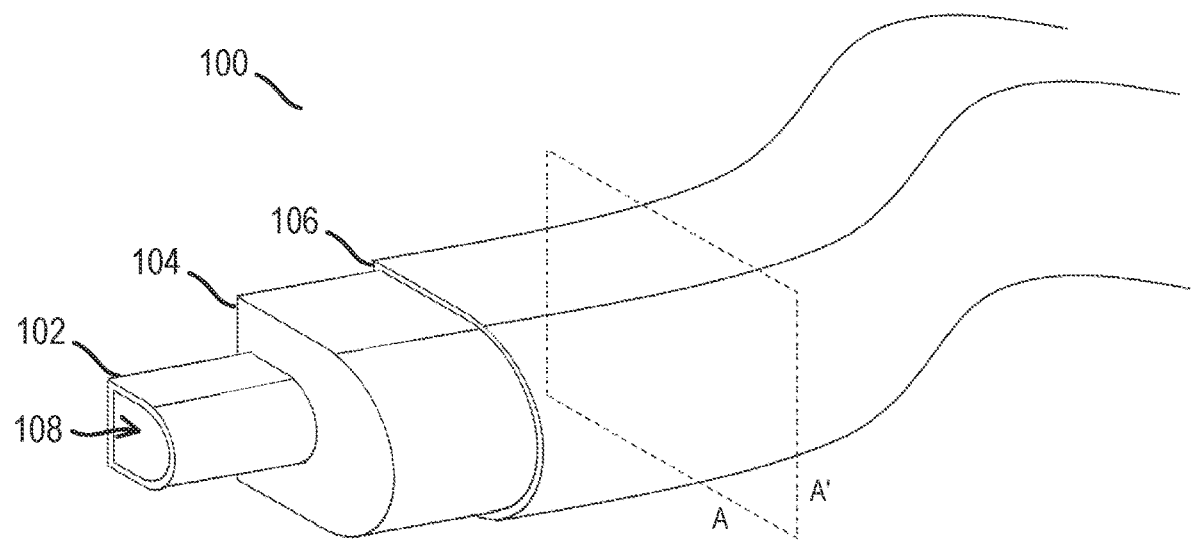
FIGS. 1A-1B illustrate cutaway and cross-sectional views of an example hose, according to certain embodiments.

Embodiments of this disclosure relate to a hose, such as a fuel hose or another type of hose, designed to transport or otherwise allow the passage of a substance. The substance could be, for example, a liquid, a gas, a vapor, or another substance. As more particular examples, the substance could be a fuel, water, engine coolant, a lubricant (e.g., oil), or another suitable substance. In certain embodiments, the hose is made of flexible materials such that the hose itself is flexible. Alternatively, the hose may be rigid.

The hose may be multilayered, and in certain embodiments includes an inner tube, a filler material, and an outer cover. The inner tube may be configured to transport or otherwise allow the passage of the substance. The filler material may include a self-sealing or self-healing material. The outer cover may be any suitable material for enclosing and containing the other layers of the hose and may protect the other layers of the hose from certain outside environmental conditions.

In certain embodiments, a cross-sectional shape of the hose (e.g., the outer cover and the filler material) includes at least one elongated edge, the elongated edge may be generally flat, straight, or planar. The elongated edge may be configured for positioning against a surface of a structure, such as vehicle or other machine, a building, or another suitable structure. In a particular example, the cross-sectional shape is a D-shape such that the cross-sectional shape of the hose includes at least one elongated edge and a curved edge opposite the elongated edge.

The inner tube may have the same cross-sectional shape as the cross-sectional shape of the hose (e.g., a D-shaped cross-sectional shape), or the inner tube may have a different shape (e.g., a circular or an ovular cross-sectional shape). The inner tube may be positioned relatively close to the elongated edge of the hose that is to be positioned adjacent to a surface of a structure. Within the hose in such an example a greater amount of filler material may be present to a first side of the inner tube (e.g., in the curved section of the D-shaped cross-sectional shape between the inner tube and the curved edge of the outer layer) than is present between the inner tube and the elongated edge of the hose that is to be positioned adjacent to a surface of a structure. In other words, within the hose, the inner tube may be shifted from a more central position toward the elongated edge of the hose that is to be positioned adjacent to a surface of a structure.

In certain use cases, the hose may be used in an environment in which one or more threats may be present. For example, in a tactical situation associated with a land-based vehicle (e.g., a truck, car, or tank) or an air-capable vehicle (e.g., an airplane or rotorcraft), a threat might include a projectile such as a bullet or shrapnel, which might puncture the hose. A hose cross-sectional shape of the hose, such as the D-shape, may allow the inner tube to be positioned within the hose in way in which greater amount of filler material (e.g., self-sealing material and/or self-sealing material) is oriented toward the potential threat. For example, the curved edge of the D-shaped cross section, which includes the greater amount of filler material, may be positioned toward the threat while the inner tube is located closer to the elongated edge of the hose, close to the surface of the structure against which the hose is positioned.

Furthermore, in certain embodiments, a perimeter and diameter of the hose may be reduced when a hose has a cross-sectional shape such as the D-shaped cross-sectional shape. For example, with the inner tube positioned closer to the elongated edge, the amount of filler material between the inner tube and the curved edge of the hose may be reduced and still meet or even exceed a minimum desired amount of filler material between the inner tube and the curved edge of the hose. This reduction in perimeter and diameter may reduce the weight of the hose, which may be desirable, without sacrificing the durability of the hose in the face of potential threats.

These and additional potential features of a multilayer hose, including a method of manufacture, are illustrated in the figures and described below.

Figure 1B:
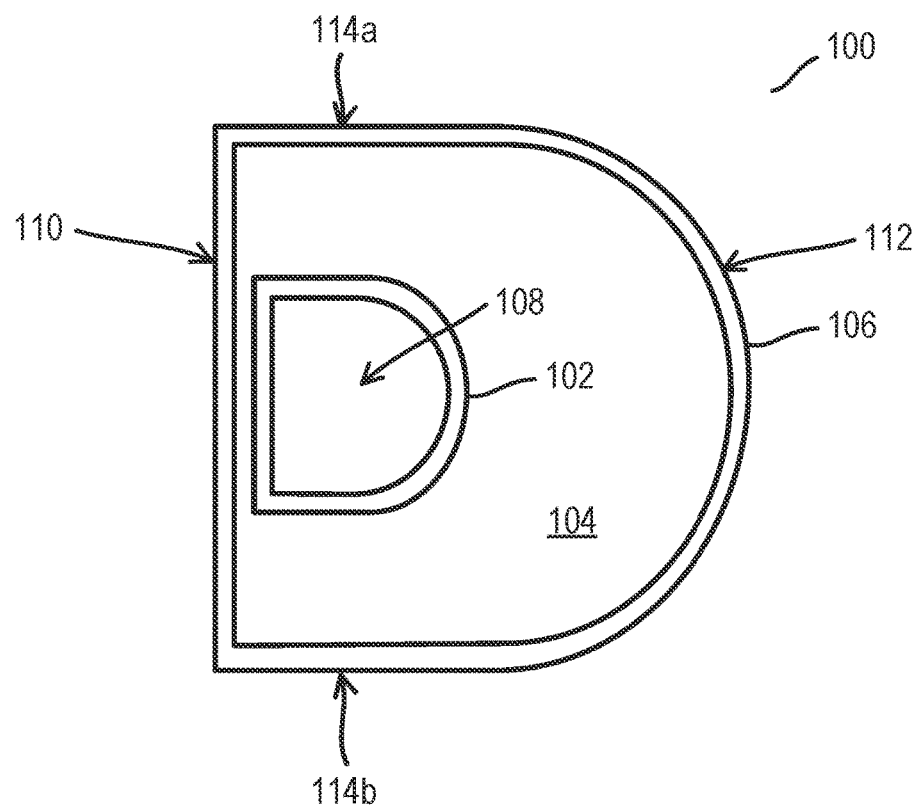

FIGS. 1A-1B illustrate cutaway and cross-sectional views of an example hose 100, according to certain embodiments. In FIG. 1A, portions of hose 100 have been omitted progressively along the length of hose 100 to reveal the example layers of hose 100. The cross-sectional view of FIG. 1B is taken along plane A×A' of FIG. 1A. The cross-section shown in FIG. 1B also has been magnified relative to the cutaway view of hose 100 shown in FIG. 1A to further illustrate certain features.

In the illustrated example, hose 100 includes an inner tube 102, a filler material 104, and an outer cover 106. Although these particular layers are described, this disclosure contemplates hose 100 including different and/or additional layers, if appropriate. Each of these layers is described in greater detail below.

Inner tube 102 is designed to contact and transport the substance to be transported by hose 100. Inner tube 102 may be manufactured to meet appropriate specification and performance requirements for transporting one or more substances in a particular environment. These specifications and performance requirements may include pressure, vacuum, temperature material compatibility, and bending performance.

In general, inner tube 102 may include one or more layers of one or more materials such as an elastomer or a plastic. For example, the inner tube 102 may include one or more layers of a polymer. If appropriate, the materials of inner tube 102 may be flexible; however, this disclosure contemplates the materials of inner tube 102 being rigid or flexible, depending on whether hose 100 itself is designed to be rigid or flexible.

The one or more layers of inner tube 102 define a cavity 108 such that inner tube 102, and hose 100, includes cavity 108. An inner surface material of inner tube 102 may be chosen to withstand the substance (e.g., fuel) and environmental conditions expected within hose 100. For example, an inner-most layer of inner tube 102 may be tolerant to the substance that hose 100 is designed to transport. Thus, the appropriate material for inner tube 102 may depend on the expected use for hose 100, including the type of substance expected to travel through hose 100.

In certain embodiments, inner tube 102 is reinforced using one or more reinforcement layers. For example, inner tube 102 may be reinforced with fibers or metal strands to handle pressure and vacuum, and to support bending. In certain embodiments, a reinforcement layer is a braiding layer that is on or within another material (e.g., a polymer layer) of inner tube 102. For example, inner tube 102 may include a flexible polymer with a reinforcement layer provided in or on the flexible polymer. As a particular example, inner tube 102 may include be a braided tube that includes a threading layer coupled to a flexible polymer layer.

Inner tube 102 may have any suitable length. For example, inner tube 102 may be pre-formed to a desired length of hose 100, or inner tube 102 may be formed to a length for later cutting (e.g., either after formation of inner tube 102 and prior to formation of other portions of hose 100, or after formation of hose 100) to a desired length.

Inner tube 102 may have any suitable cross-sectional shape. For example, the cross-sectional shape of inner tube 102 could be D-shaped, ovular, circular, square, hexagonal, or any other suitable shape. In the illustrated example of FIGS. 1A and 1B, inner tube 102 has a D-shaped cross-sectional shape. The particular cross-sectional shape of inner tube 102 may be chosen for any suitable reasons, including, for example, the performance requirements and/or material(s) of inner tube 102.

Although the layer(s) of material(s) that forms inner tube 102 may have any suitable thickness, in certain embodiments, inner tube 102 is about 0.25 mm to about 3.0 mm thick. The particular thickness that is appropriate may depend on the material(s) of inner tube 102, other materials of hose 100, the substance to be carried by hose 100 (within cavity 108 of inner tube 102), the environment in which hose 100 is expected to be used, particular requirements (which may be set by certain standard setting bodies or other organizations), and/or any other factors. The particular thickness values described herein are provided as examples only.

Cavity 108 of inner tube 102 has a cross-sectional area (e.g., at a cross-section of hose 100, such as the cross-section shown in FIG. 1B taken along plane A×A' of FIG. 1A) and associated volume (e.g., along a length of hose 100). The cross-sectional area/volume may have any suitable value, and in some cases, may be established according to an applicable standard or set of requirements. The cross-sectional area/volume may be defined, at least in part, according to a diameter of cavity 108. For example, in the case of an inner tube 102 having a circular cross-sectional shape, the diameter of the circle may be the traditional diameter of a circle. As another example, in the case of an inner tube 102 having an ovular cross-sectional shape, the oval may have two diameter values, with each diameter intersecting at a mid-point of the oval. As another example, in the case of a D-shaped hose, the diameter may be a value from a mid-point of an elongated edge to a mid-point of a curved edge of the D-shape. Other values for determining a cross-sectional area/volume of an inner tube according to embodiments of this disclosure may be determined in any suitable manner. As just one example, the diameter of inner tube 102 may be approximately 20 mm.

The particular diameter and associated cross-sectional area/volume that is appropriate may depend on the material (s) of inner tube 102, other materials of hose 100, the substance to be carried by hose 100 (within cavity 108 of inner tube 102), the environment in which hose 100 is expected to be used, particular requirements (which may be set by certain standard setting bodies or other organizations), and/or any other factors. The particular values described herein are provided as examples only.

Filler material 104 may be provided around an outer periphery of inner tube 102 and may occupy space between inner tube 102 and outer cover 106. For example, filler material 104 may be provided on an outer surface of inner tube 102 (though one or more intervening layers are contemplated). In certain embodiments, filler material 104 surrounds inner tube 102. If appropriate, filler material 104 may be flexible; however, this disclosure contemplates filler material 104 being rigid or flexible, depending on whether hose 100 itself is designed to be rigid or flexible. Filler material 104 may serve one or more of a variety of purposes, depending on the application for hose 100.

As one example purpose, filler material 104, potentially in addition to outer cover 106, may protect inner tube 102 from damage and/or allow hose 100 to recover from damage even if inner tube 102 is pierced by a projectile (e.g., a bullet or shrapnel) that punctures outer cover 106, filler material 104, and or inner tube 102. Such a filler material 104 may allow hose 100 to continue to be operational, with minimal or no leakage of a substance traveling through hose 100, after hose 100 is struck by the projectile, even if that projectile punctures inner tube 102. Filler material 104 may provide self-sealing/self-healing performance of hose 100 to seal puncture and/or tearing wounds to hose 100 and reduce or eliminate substances (e.g., liquids) from escaping hose 100 as well as outside air from getting sucked into hose 100. As just a few examples, filler material 104 may include a rubber, a gel, a fabric, a combination of these or other materials, or any other materials suitable for the expected application of hose 100.

As one example, filler material 104 may include a self-sealing material. A self-sealing material may be a material that is configured to seal itself as the self-sealing material is being, or after the self-sealing material has been, punctured (e.g., by a projectile or other object). Self-sealing material may be placed around inner tube 102 to allow hose 100 to self-seal if inner tube 102 is punctured.

This disclosure contemplates filler material 104 including any suitable type of self-sealing material. For example, self-sealing materials may include rubber, elastomers, or other self-sealing polymers that may seal holes, tears, or other openings in hose 100 (e.g., in the self-sealing material itself and/or in adjacent structures of hose 100, such as inner tube 102 and/or outer cover 106) automatically when such damage occurs. As a particular example of a self-sealing material, filler material 104 may include a material (e.g., an uncured rubber) that is configured to swell in response to contact with an aromatic substance (e.g., an aromatic fuel), such that the self-sealing material plugs holes, tears, or other openings in hose 100. As another particular example of a self-sealing material, filler material 104 may include a self-sealing fabric. As just one example, such a self-sealing fabric may be formed from ultra-high molecular weight polyethylene. Such a self-sealing fabric might or might not be reactive to a substance to be carried by hose 100.

As another example, filler material 104 may include a seal-healing material. A self-healing material may be a material that is configured to self-heal autonomously, potentially without exposure to an external stimulus. A self-healing property may include a built-in ability of the material to automatically repair damage to the material without external diagnosis of the problem or human intervention to repair the problem. Self-healing materials also may have a self-sealing property. Self-healing material may be placed around inner tube 102 to allow hose 100 to self-seal if inner tube 102 is punctured.

This disclosure contemplates filler material 104 including any suitable type of self-healing material. For example, self-healing materials may include rubber, elastomers, or other self-healing polymers. As a particular example of a self-healing material, filler material 104 may include an elastomeric polymer, possibly including certain additional additives, that is configured to self-heal when punctured. As another particular example of a self-healing material, filler material 104 may include a self-healing elastomeric containment gel. As just one example, such a self-sealing gel may be formed from one or more of isocyanate, polyol, methylene diphenyl diisocyanate, a plasticizer, a catalyst material (e.g., an organotin or amine catalyst), a tackifier (e.g., a hydrocarbon resin, a terpene, or a gum resin), an antimicrobial agent, an antifouling agent, or any other suitable materials.

As another example purpose, filler material 104, potentially in addition to outer cover 106, may protect inner tube 102 from damage that may be caused by environmental conditions.

As another example, filler material 104 may be configured to insulate a substance traveling through hose 100.

Although this disclosure describes particular example purposes for filler material 104, this disclosure contemplates filler material 104 serving any suitable purpose in addition to or in place of any one or more described example purposes.

Outer cover 106 may be one or more layers of material that surround the other layers of hose 100, including filler material 104 and inner tube 102, and may operate as an outer jacket to enclose and contain the other materials of hose 100 and to protect the other materials of hose 100 from environmental conditions. Outer cover 106 may be provided around an outer periphery of filler material 104. For example, outer cover 106 may be provided on an outer surface of filler material 104 (though one or more intervening layers are contemplated).

Outer cover 106 is variable according to particular implementations and may be tailored to the anticipated environmental requirements, if applicable. Outer cover 106 may be a braided layer, a coating, an outer film barrier, or a combination of these and/or other materials. In certain embodiments, outer cover 106 may be made of one or more suitable flexible elastomeric or plastic materials designed to withstand the exterior environment encountered. In certain embodiments, outer cover 106 is formed from a single non-fluorinated rubber formulation. Inner tube 102 and outer cover 106 may be made of the same or different materials. If appropriate, the materials of outer cover 106 may be flexible; however, this disclosure contemplates the materials of outer cover 106 being rigid or flexible, depending on whether hose 100 itself is designed to be rigid or flexible.

In certain embodiments, outer cover 106 wraps around the entire hose 100 and protects hose 100 (including the other materials of hose 100) from environmental conditions, as well as providing support against outward pressure from substances traveling through inner tube 102. For example, outer cover 106 may protect hose 100 from fluids, fire, the natural environment, physical damage, and other potential threats.

Although the layer(s) of material(s) that forms outer cover 106 may have any suitable thickness, in certain embodiments, outer cover 106 is about 0.5 mm to about 4.0 mm thick. The particular thickness that is appropriate may depend on the material(s) of outer cover 106, other materials of hose 100, the substance to be carried by hose 100 (within cavity 108 of inner tube 102), the environment in which hose 100 is expected to be used, particular requirements (which may be set by certain standard setting bodies or other organizations), and/or any other factors. The particular thickness values described herein are provided as examples only.

Outer cover 106 has a cross-sectional shape that also corresponds to a cross-sectional shape of hose 100. In certain embodiments, the cross-sectional shape of outer cover 106 includes at least one elongated edge. In the illustrated example, outer cover 106 has a D-shaped cross-sectional shape that includes an elongated edge 110 and a curved edge 112 opposite elongated edge 110. Additionally, in the illustrated example, the D-shaped cross-sectional shape includes two substantially parallel elongated edges 114a and 114b extending substantially perpendicularly from opposing ends of elongated edge 110 and connecting to opposing ends of curved edge 112. Although this particular implementation of a D-shaped cross-sectional shape is illustrated and described, this disclosure contemplates other implementations of a D-shaped cross-sectional shape. Elongated edge 110 and elongated edges 114a and 114b also could be referred to as flat edges, if appropriate. For example, the elongated edge may be generally flat, straight, or planar. Furthermore, if appropriate, an elongated edge may include ridges, irregularities, or other variations, an example of which is illustrated in and described below with reference to FIG. 3.

In the illustrated example of FIGS. 1A and 1B, inner tube 102 also has a D-shaped cross-sectional shape that substantially matches the D-shaped cross-sectional shape of outer cover 106. In other implementations, the inner tube 102 has a different cross-sectional shape than the cross-sectional shape of outer cover 106. In the illustrated example, inner tube 102 is positioned within filler material 104 and outer cover 106 closer to elongated edge 110 than to curved edge 112, and approximately equidistant from elongated edges 114a and 114b. Associated potential benefits of the D-shaped cross-sectional shape of hose 100 and/or positioning of inner tube 102 closer to elongated edge 110 than to curved edge 112, along with the cross-sectional shape of outer cover 106/hose 100 are described below in connection with FIGS. 2A-2C.

Although hose 100 has been described as including these three layers (e.g., inner tube 102, filler material 104, and outer cover 106), this disclosure contemplates hose 100 including additional layers, if appropriate. For example, hose 100 may include one or more intervening layers, such as one or more adhesive layers, one or more textile or fabric layers, or any other suitable layers. An adhesive layer may include a bonding material configured to facilitate adhesion between two layers of hose 100. The bonding material may include any suitable material and may depend on the particular layers being coupled together.

Although hose 100 may have any suitable thickness, in certain embodiments, hose 100 is about 25.0 mm to about 100.0 mm thick, as measured in this example from a mid-point of elongated edge 110 to a mid-point of a curved edge 112 of the D-shape. The particular thickness that is appropriate may depend on the materials of hose 100, the substance to be carried by hose 100, the environment in which hose 100 is expected to be used, particular requirements (which may be set by certain standard setting bodies or other organizations), and/or any other factors. The particular thickness values described herein are provided as examples only.

Figure 2A:
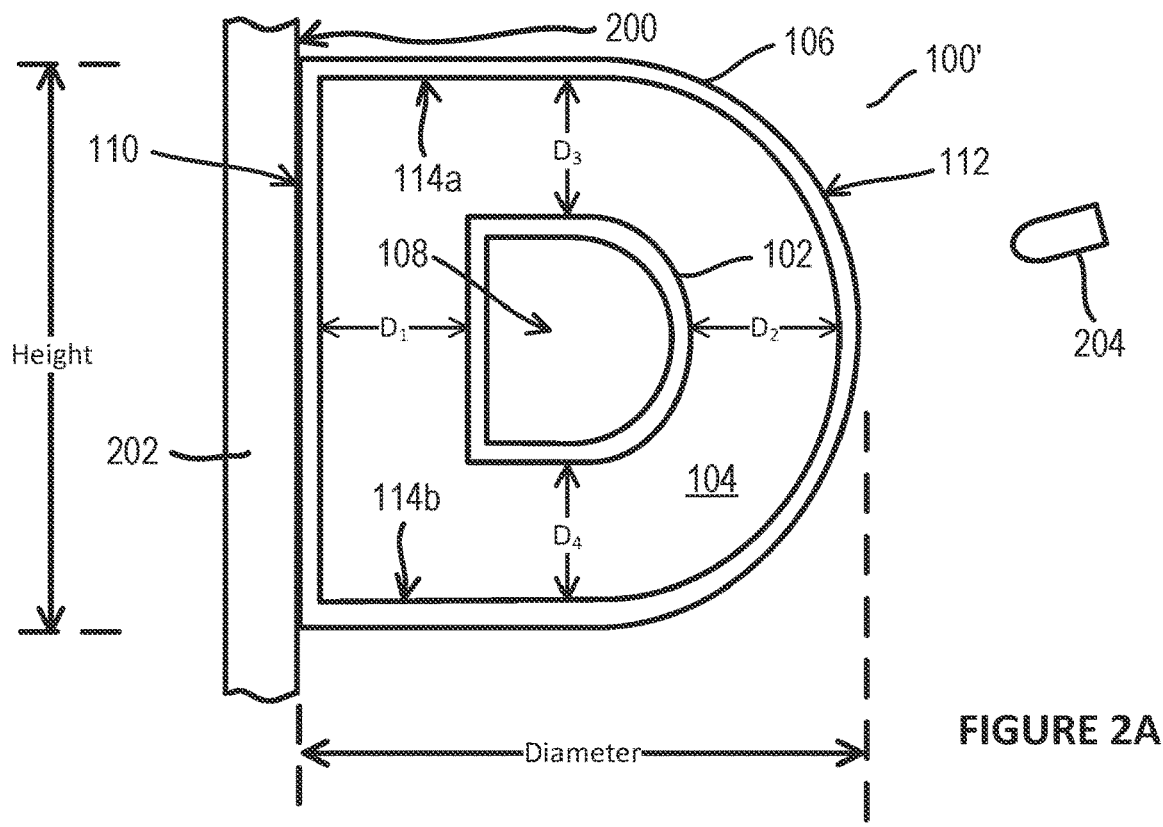
FIGS. 2A-2C illustrate various example positions of an inner tube within the hose of FIGS. 1A-1B, according to certain embodiments.
Figure 2B:
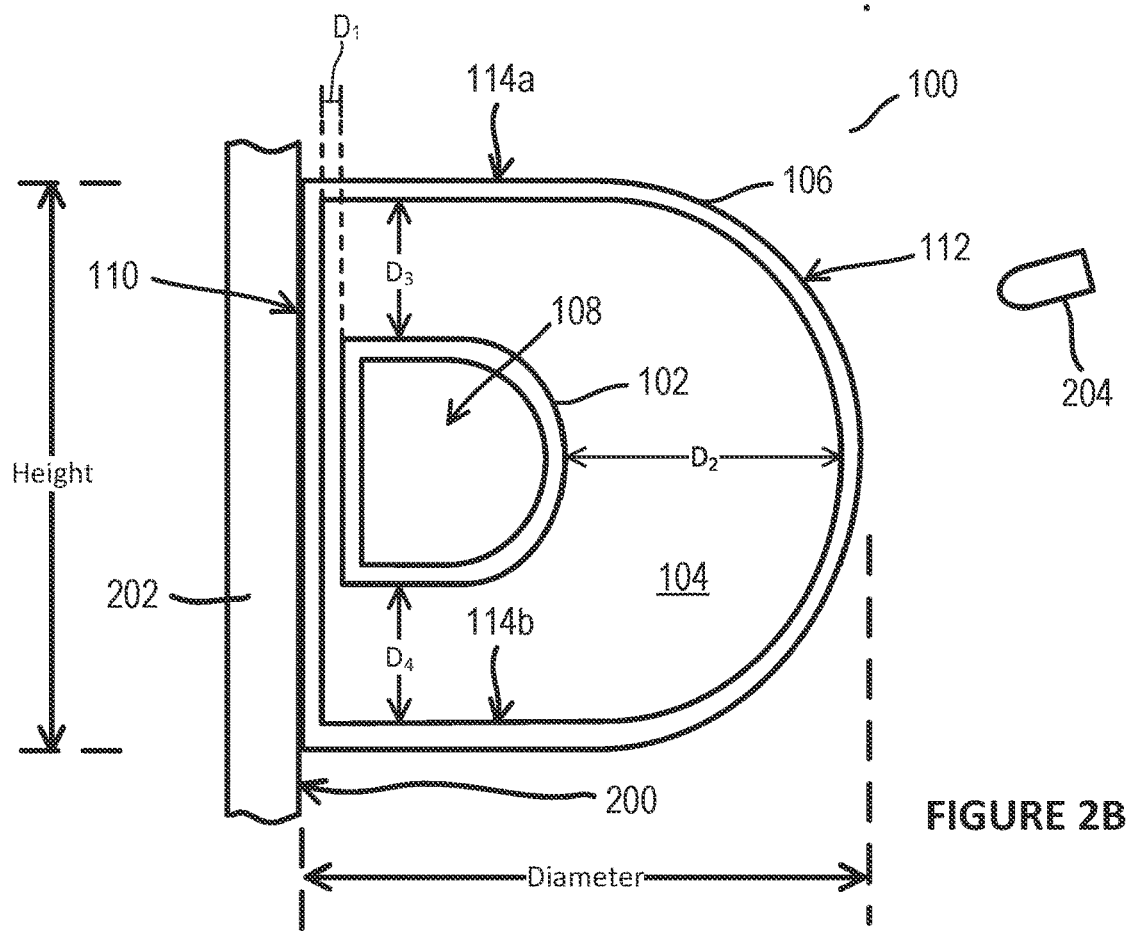
Figure 2C:
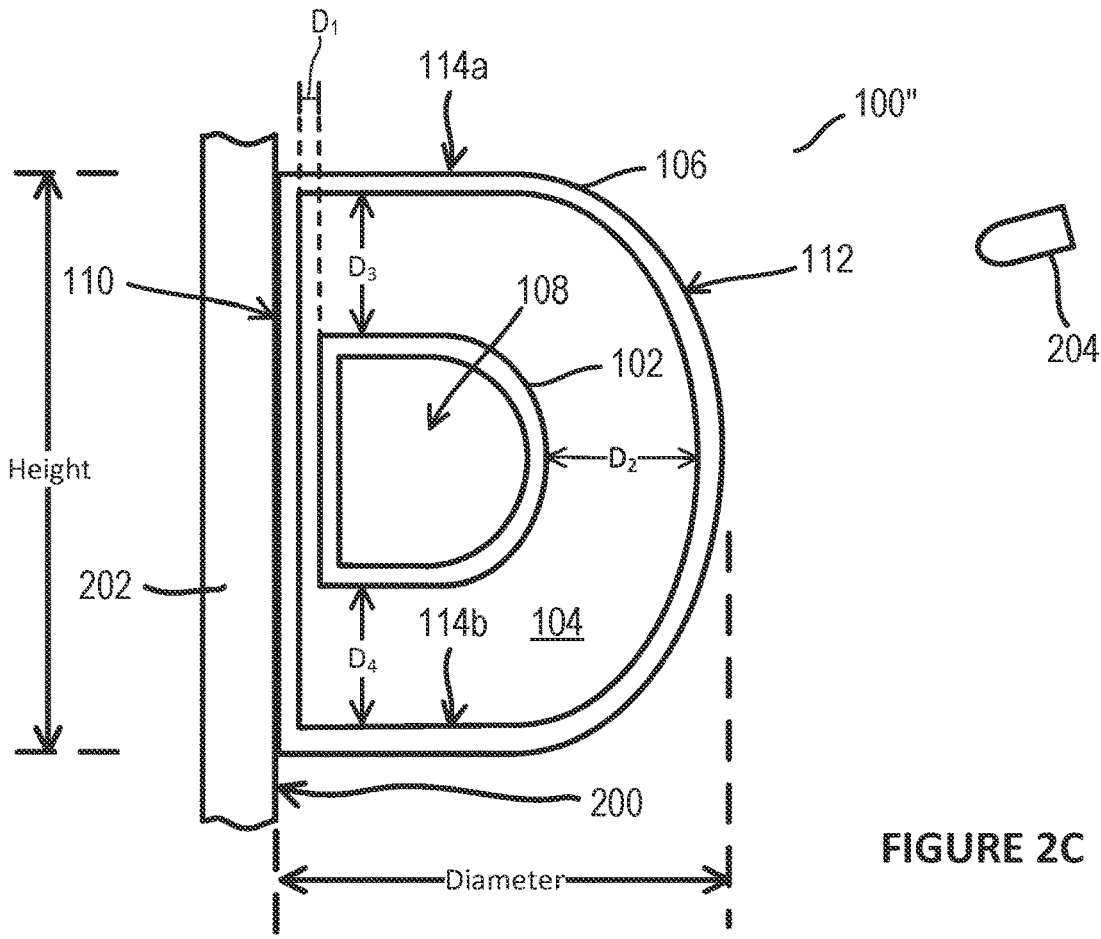

FIGS. 2A-2C illustrate various example positions of inner tube 102 within hose 100 of FIGS. 1A-1B, according to certain embodiments. Thus, as in FIGS. 1A-1B, hose 100 of FIGS. 2A-2C has a D-shaped cross-sectional shape that includes an elongated edge 110, a curved edge 112 opposite elongated edge 110, and elongated edges 114a and 114b. Additionally, in each of the examples illustrated in FIGS. 2A-2C, the respectively illustrated hose 100 is positioned against a surface 200 of a structure 202. Structure 202 could be a portion of vehicle (e.g., an airborne or land-based vehicle), a machine, a building, or any other type of structure.

For purposes of distinguishing the implementations of hose 100 shown in FIGS. 2A-2C, the hose illustrated in FIG. 2A will be referred to as hose 100', the hose illustrated in FIG. 2B will be referred to as hose 100 (i.e., without any hash mark), and the hose illustrated in FIG. 2C will be referred to as hose 100". No hash mark is used with reference to hose 100 of FIG. 2B because hose 100 of FIG. 2B is intended to match hose 100 of FIGS. 1A-1B, whereas hoses 100' and 100" include inner tube 102 at different locations than hose 100 and/or have other distinguishing features, as described below.

As shown in FIG. 2A, hose 100' includes inner tube 102, filler material 104, and outer cover 106. For hose 100', inner tube 102 is positioned within filler material 104 at approximately the center of the cross-sectional D-shape of hose 100' (e.g., of outer cover 106). That is, for hose 100', distance $D_1$ is approximately equal to distance $D_2$, and distance $D_3$ is approximately equal to distance $D_4$. In certain embodiments, for hose 100', it also may be true that $D_1$ and $D_2$ are approximately equal to $D_3$ and $D_4$. In certain embodiments of hose 100', from a cross-sectional perspective, inner tube 102 may be surrounded by approximately equal thicknesses of filler material 104 on all sides. As illustrated, hose 100' has a height and a diameter.

In certain embodiments, elongated edge 110 of hose 100 may be oriented toward surface 200 of structure 202. In certain embodiments, a thickness of filler material 104 between inner tube 102 and curved edge 112 of outer cover 106 may meet a minimum requirement for a particular application. For example, in a military context or the like, certain standards for the thickness of filler material 104 may be specified for addressing the possibility of a threat to hose 100. A threat may include potential exposure to, and potential puncturing by, a projectile 204. In certain embodiments, projectile 204 includes a bullet, shrapnel, or another type of projectile. The thickness of filler material 104 between inner tube 102 and outer cover 106 may meet the minimum specified requirement.

Although the layer(s) of material(s) that forms filler material 104 may have any suitable thickness, in certain embodiments, filler material 104 is about 4.0 mm to about 40.0 mm thick. In other words, for hose 100', distance $D_1$ may be approximately 25.0 mm, distance $D_2$ may be approximately 25.0 mm, distance $D_3$ may be approximately 25.0 mm, and distance $D_4$ may be approximately 25.0 mm. To the extent hose 100' is to be used in a tactical environment where projectiles (e.g., bullets and/or shrapnel) are a potential threat, it may be desirable for the thickness of filler material 104 that is oriented toward the threat to be as thick as at least 1 to 2 times the expected length (1.0 to 2.0 times diameter for 900 round) of a bullet that may be encountered, and the particular thickness values may be a function of the anticipated threat level. In relation to the above-described example range of about 4.0 mm to about 40.0 mm for filler material 400, the lower end of the range may cover smaller arms fire, while the upper (thicker) end of the range may cover 12.5 mm and greater arms fire. The particular thickness that is appropriate may depend on the material(s) of hose 100', the substance to be carried by hose 100' (within cavity 108 of inner tube 102), the environment in which hose 100' is expected to be used, particular requirements (which may be set by certain standard setting bodies or other organizations), and/or any other factors. The particular thickness values described herein are provided as examples only.

As shown in FIG. 2B, and as described above with reference to FIGS. 1A-1B, hose 100 includes inner tube 102, filler material 104, and outer cover 106. For hose 100, from a cross-sectional perspective, inner tube 102 is positioned within filler material 104 closer to elongated edge 110 of outer cover 106 than to curved edge 112 of outer cover 106. That is, for hose 100, distance $D_1$ (from inner tube 102 to elongated edge 110) is less (and, in the illustrated example, substantially less) than distance $D_2$ (from inner tube 102 to curved edge 112). In the illustrated example of FIG. 2B, for hose 100, distance $D_3$ is approximately equal to distance $D_4$. This means that for hose 100, the thickness of filler material 104 between inner tube 102 and elongated edge 110 is less than the thickness of filler material 104 between inner tube 102 and curved edge 112. Indeed, this disclosure contemplates inner tube 102 abutting elongated edge 110 such that at least one point, no filler material 104 is present between inner tube 102 and elongated edge 110. As illustrated, hose 100 has a height and a diameter. For purposes of this example, the height and diameter of hose 100 are substantially the same as the height and diameter of hose 100' of FIG. 2A.

Hose 100 otherwise has substantially the same cross-sectional profile as hose 100' of FIG. 1A. Due at least in part to the cross-sectional shape of hose 100 (e.g., including the cross-sectional shape of outer cover 106) and the positioning of inner tube 102 toward elongated edge 110 of outer cover 106, the amount of filler material 104 between inner tube 102 and curved edge 112 of outer cover 106 may be increased relative to hose 100', as well as relative to conventional hoses, without increasing the overall size (e.g., diameter) of the hose.

In certain embodiments, elongated edge 110 of hose 100 may be oriented toward surface 200 of structure 202. In a tactical application, positioning elongated edge 110—the side of hose 100 that includes less filler material between inner tube 102 and outer cover 106—toward surface 200 of structure 202, and orienting curved edge 112—the side of hose 100 that includes more filler material 104 between inner tube 102 and outer cover 106—toward a potential threat may provide increased protection for inner tube 102 and/or increase resiliency for hose 100, by increasing the chances that a puncture in hose 100 in the direction of the threat (e.g., a projectile 204) will be sealed by filler material 104. This allows filler material 104 of hose 100 that is oriented toward a threat and more likely to encounter a projectile 204 to be thicker.

An implementation in which the cross-sectional shape of hose 100 has at least one elongated edge (e.g., elongated edge 110), and particularly when the cross-sectional shape of hose 100 has only one elongated edge (e.g., elongated edge 110), may ease installation of hose 100 by simplifying identification of which surface of hose 100 to position toward surface 200 of structure 202. In certain embodiments, in an example in which the cross-sectional shape of hose 100 includes multiple elongated edges 110, examples of which are described below with reference to FIGS. 4G and 4H, a particular elongated edge no may be marked on an exterior portion of outer cover 106 in a suitable manner to indicate to which elongated edge 110 the inner tube 102 is closer. Additionally or alternatively, in an example in which the cross-sectional shape of hose 100 includes multiple elongated edges no but for which one elongated edge no is inherently distinguishable from the other elongated edges 110 (e.g., due to the length of the distinguishable elongated edge 110), such as may be the case with a D-shaped hose 100 for example, a particular elongated edge no may be readily known to be the elongated edge 110 to which inner tube 102 is closer. For example, an instruction manual may indicate that the longer elongated edge no of the D-shaped hose 100 should be positioned toward a surface 200 of a structure 202.

Although the layer(s) of material(s) that forms filler material 104 may have any suitable thickness, in certain embodiments, filler material 104 is about 4.0 mm to about 40.0 mm thick. In other words, for hose 100, distance $D_1$ may be approximately 4.0 mm, distance $D_2$ may be approximately 40.0 mm, distance $D_3$ may be approximately 22.0 mm, and distance $D_4$ may be approximately 22.0 mm. To the extent hose 100 is to be used in a tactical environment where projectiles (e.g., bullets and/or shrapnel) are a potential threat, it may be desirable for the thickness of filler material 104 that is oriented toward the threat to be as thick as at least 1 to 2 times the expected length (1.0 to 2.0 times diameter for 900 round) of a bullet that may be encountered, and the particular thickness values may be a function of the anticipated threat level. In relation to the above-described example range of about 4.0 mm to about 40.0 mm for filler material 400, the lower end of the range may cover smaller arms fire, while the upper (thicker) end of the range may cover 12.5 mm and greater arms fire. The particular thickness that is appropriate may depend on the material(s) of hose 100, the substance to be carried by hose 100 (within cavity 108 of inner tube 102), the environment in which hose 100 is expected to be used, particular requirements (which may be set by certain standard setting bodies or other organizations), and/or any other factors. The particular thickness values described herein are provided as examples only.

As shown in FIG. 2C, hose 100" includes inner tube 102, filler material 104, and outer cover 106. Hose 100" of FIG. 2C is generally similar to hose 100 of FIG. 2B; however, for hose 100" of FIG. 2C, the thickness of filler material 104 between inner tube 102 and curved edge 112 of outer cover 106 has been reduced relative to the filler material 104 of the corresponding portion of hose 100 of FIG. 2B. That is, for hose 100" of FIG. 2C, distance $D_2$ (from inner tube 102 to curved edge 112) is less than distance $D_2$ (from inner tube to curved edge 112) for hose 100 of FIG. 2B. In the illustrated example of FIG. 2C, for hose 100", distance $D_3$ is approximately equal to distance $D_4$. As illustrated, hose 100" has a height and a diameter. For purposes of this example, the height of hose 100" is substantially the same as the height of hoses 100 and 100' of FIGS. 2B and 2A, respectively. Due at least in part to the reduction in fill material 104 and the modified profile of curved edge 112 of hose 100", as illustrated, the perimeter and diameter of hose 100" is less than the perimeter and diameter of hoses 100 and 100' of FIGS. 2B and 2A, respectively.

Due at least in part to the placement of inner tube 102 closer to elongated edge 110 of hose 100 and the cross-sectional shape of hose 100, the amount of filler material between inner tube 102 and the curved edge 112 of outer cover 106 may be reduced relative to hose 100 and still provide the same amount of filler material 104 as was provided with hose 100', which, as described above, may have a minimum required thickness. Hose 100" illustrates an example result of such a reduction. Thus, with hose 100" the overall thickness (e.g., diameter) of hose 100" may be reduced (e.g., relative to hoses 100 and 100') and hose 100" still may satisfy a minimum requirement. In certain embodiments, a cross-sectional area/volume of cavity 108 of inner tube 102 (and thereby hose 100") may be maintained relative to a cavity 108 of hose 100 and a cavity 108 of hose 100', even with the reduced overall perimeter/diameter of hose 100". This may allow the flow rate of the substance to be carried by the hose to be maintained even though the overall thickness of hose 100" has been reduced. Alternatively, the cross-sectional area/volume of cavity 108 of inner tube 102 (and thereby hose 100") may be different than the cross-sectional area/volume of a cavity 108 of inner tube 102 of hose 100 and/or the cross-sectional area/volume of a cavity 108 of inner tube 102 of hose 100", if desired.

In one example, the thickness of filler material 104 between inner tube 102 and curved edge 112 of outer cover 106 may be reduced until the thickness of filler material substantially matches the thickness of filler material 104 between inner tube 102 and curved edge 112 of hose 100' (e.g., assuming that hose 100' is at the minimum limit to satisfy a requirement). Such an implementation of hose 100" may maximize the reduction in thickness of hose 100" and weight of hose 100". Alternatively, a hose manufacture could balance between the size (e.g., thickness)/reduction in weight and protection (e.g., thickness of filler material between inner tube 102 and curved edge 112 of outer cover 106 of hose 100"), which may reduce the thickness of filler material 104 somewhat while still increasing thickness of filler material 104 oriented to the threat relative to hose 100', for example. This could achieve some reduction in size and weight, while still potentially increasing the durability of hose 100" relative to hose 100' and/or conventional hoses.

As with hose 100 in FIG. 2B, an implementation of a hose 100" in which the cross-sectional shape of hose 100" has at least one elongated edge (e.g., elongated edge 110), and particularly when the cross-sectional shape of hose 100" has only one elongated edge (e.g., elongated edge 110) may ease installation of hose 100" by simplifying identification of which surface of hose 100" to position toward surface 200 of structure 202. In certain embodiments, in an example in which the cross-sectional shape of hose 100" includes multiple elongated edges 110, examples of which are described below with reference to FIGS. 4G and 4H, a particular elongated edge 110 may be marked on an exterior portion of outer cover 106 in a suitable manner to indicate to which elongated edge 110 the inner tube 102 is closer. Additionally or alternatively, in an example in which the cross-sectional shape of hose 100" includes multiple elongated edges 110 but for which one elongated edge 110 is inherently distinguishable from the other elongated edges 110 (e.g., due to the length of the distinguishable elongated edge 110), such as may be the case with a D-shaped hose 100 for example, a particular elongated edge 110 may be readily known to be the elongated edge 110 to which inner tube 102 is closer. For example, an instruction manual may indicate that the longer elongated edge 110 of the D-shaped hose 100 should be positioned toward a surface 200 of a structure 202.

Although the layer(s) of material(s) that forms filler material 104 may have any suitable thickness, in certain embodiments, filler material 104 is about 4.0 mm to about 60.0 mm thick. In other words, for hose 100, distance $D_1$ may be approximately 4.0 mm, distance $D_2$ may be approximately 50.0 mm, distance $D_3$ may be approximately 30.0 mm, and distance $D_4$ may be approximately 30.0 mm. To the extent hose 100" is to be used in a tactical environment where projectiles (e.g., bullets and/or shrapnel) are a potential threat, it may be desirable for the thickness of filler material 104 that is oriented toward the threat to be as thick as at least 1 to 2 times the expected length (1.0 to 2.0 times diameter for 900 round) of a bullet that may be encountered, and the particular thickness values may be a function of the anticipated threat level. In relation to the above-described example range of about 4.0 mm to about 40.0 mm for filler material 400, the lower end of the range may cover smaller arms fire, while the upper (thicker) end of the range may cover 12.5 mm and greater arms fire. The particular thickness that is appropriate may depend on the material(s) of hose 100", the substance to be carried by hose 100" (within cavity 108 of inner tube 102), the environment in which hose 100" is expected to be used, particular requirements (which may be set by certain standard setting bodies or other organizations), and/or any other factors. The particular thickness values described herein are provided as examples only.

Figure 3:
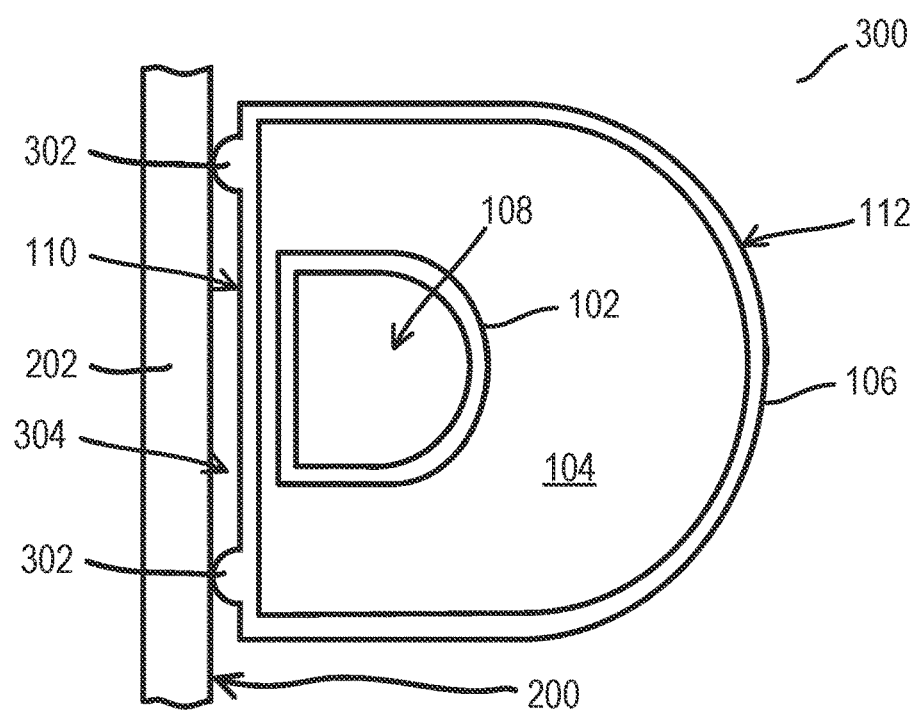
FIG. 3 illustrates an example implementation of a hose, according to certain embodiments.

FIG. 3 illustrates an example implementation of a hose 300, according to certain embodiments. Hose 300 is generally similar to hose 100; however, hose 300 includes knobs 302 formed along elongated edge 110 of outer cover 106 of hose 300. Knobs 302 may form an air gap 304 between surface 200 of structure 202 and hose 300 (and particularly elongated edge 110 of hose 300), which may be used for airflow, temperature control, moisture drainage (e.g., associated with environmental conditions and/or other components of structure 202), or any other suitable purpose.

In part, knobs 302 illustrate that while elongated edge 110 is generally described as flat, it should be understood that "elongated" and "flat" merely refer to the overall profile of elongated edge 110 and that elongated edge 110 could include additional features or have additional properties that render elongated edge 110 not perfectly flat. As an alternative to knobs 302, elongated edge 110 could be sawtoothshaped, which also could provide air gaps between surface 200 of structure 202 and hose 300 (or any other hose according to this disclosure).

FIGS. 4A-4H illustrate various alternative cross-sectional shapes and cross-sectional shape combinations for a hose, according to certain embodiments. In particular, FIGS. 4A-4H illustrate hoses 400a-400h, respectively. In the illustrate examples, each of hoses 400a-400h has at least one elongated edge 110 that is positioned toward a surface 200 of a structure 202.

Figure 4A:
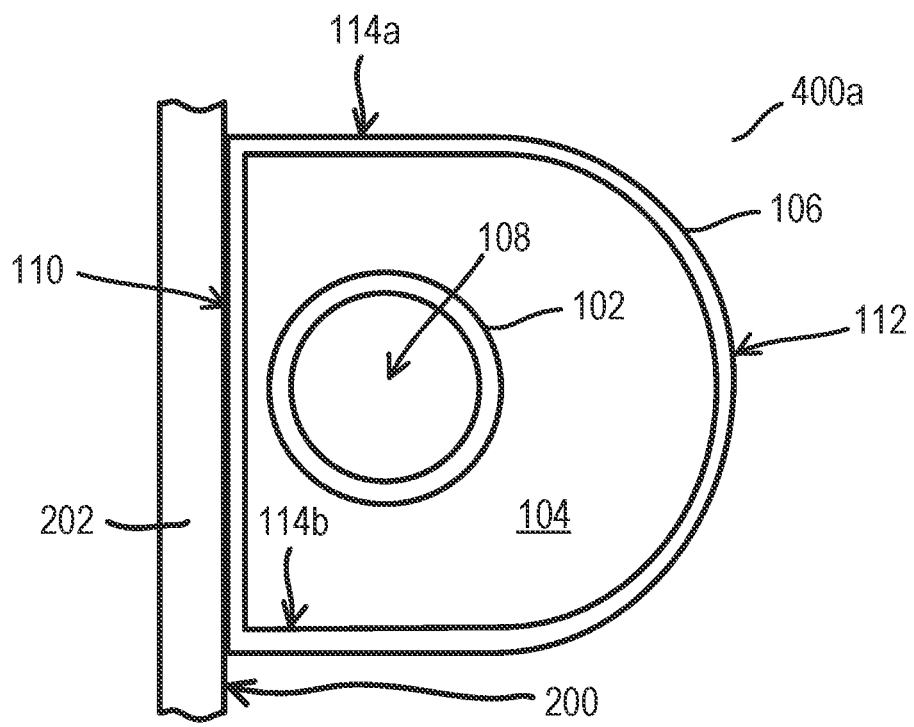
FIGS. 4A-4H illustrate various alternative cross-sectional shapes and cross-sectional shape combinations for a hose, according to certain embodiments.
Figure 4B:
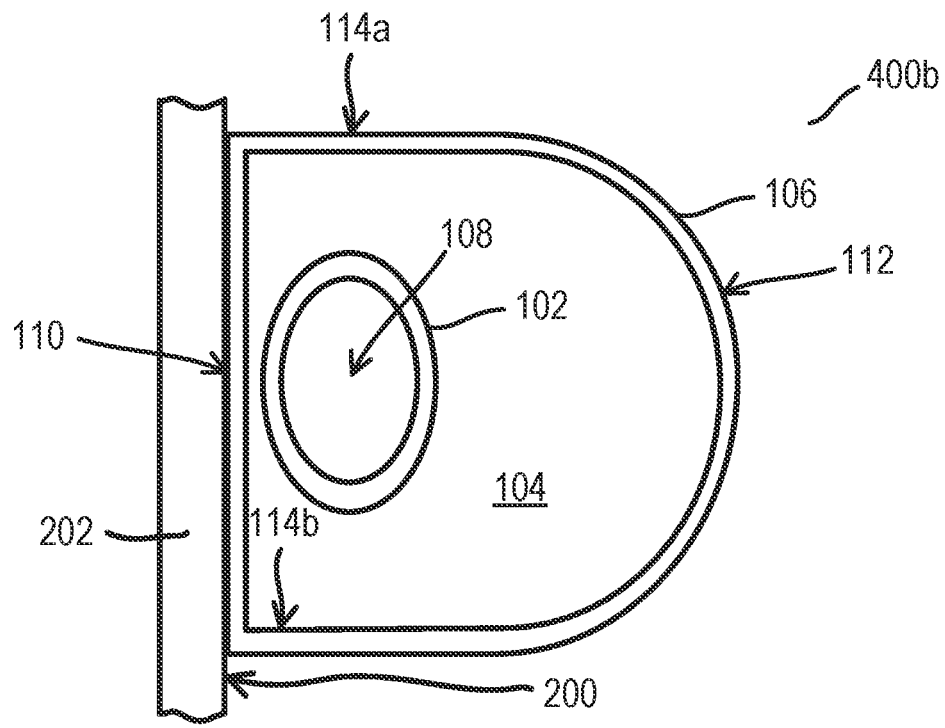

FIGS. 4A-4B illustrate hoses 400a and 400b, respectively, both of which have a cross-sectional shape that is substantially similar to the cross-sectional shape of hose 100/100', but for both hoses 400a and 400b, the cross-sectional shape of inner tube 102 is different than the cross-sectional shape of outer cover 106 (and thereby hose 400a/400b). That is, FIGS. 4A-4B illustrate that for certain embodiments of this disclosure, the cross-sectional shape of inner tube 102 can differ from the cross-sectional shape of the outer cover 106/hose.

For example, inner tube 102 of hose 400a has a circular cross-sectional shape, while the cross-sectional shape of outer cover 106/the overall hose 400a is a D-shaped cross-sectional shape. As another example, inner tube 102 of hose 400b has an ovular cross-sectional shape, while the cross-sectional shape of outer cover 106/the overall hose 400a is a D-shaped cross-sectional shape. If desired, the amount of filler material between inner tube 102 and the curved edge 112 of hoses 400a and 400b also could be reduced in a similar manner as was done with hose 100".

Figure 4C:
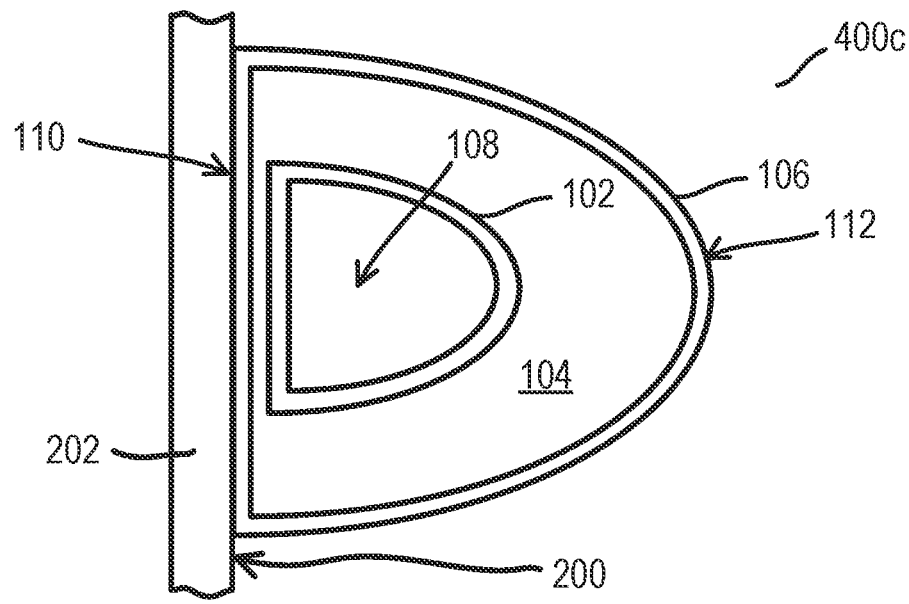
Figure 4D:
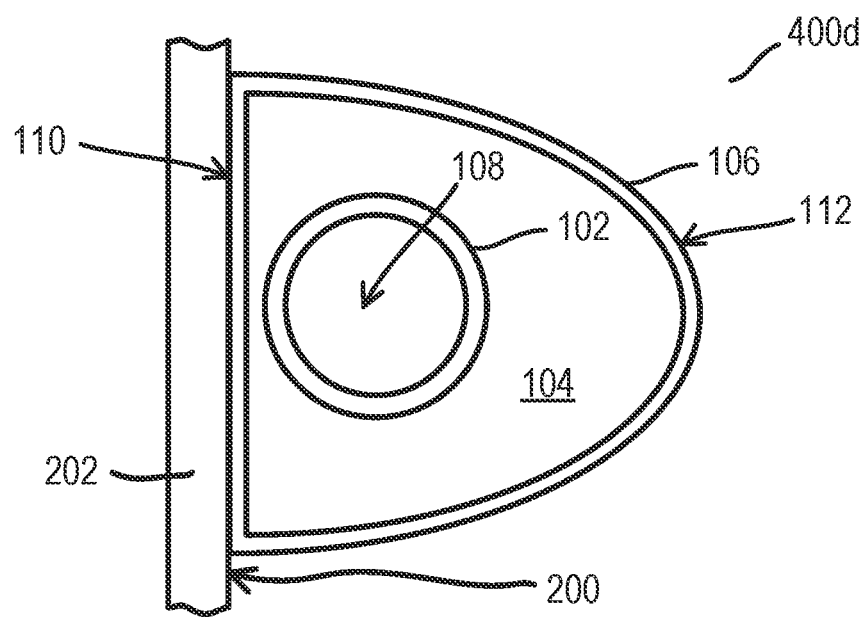

FIGS. 4C-4D illustrate hoses 400c and 400d, respectively. For each of hoses 400c and 400d, the cross-sectional shape of the outer cover 106 eliminates parallel elongated edges 114a and 114b from the D-shaped cross-sectional shape such that curved edge 112 couples directly to opposing ends of elongated edge 110. The cross-sectional shape of hoses 400c and 400d resembles an arch, or a narrowed D-shape. FIG. 4C illustrates an example hose 400c in which inner hose 102 has a matching cross-sectional shape to the cross-sectional shape of outer cover 106. FIG. 4D illustrates an example hose 400d in which inner hose 102 has a different cross-sectional shape (circular in the illustrated example) than the cross-sectional shape of outer cover 106.

Figure 4E:
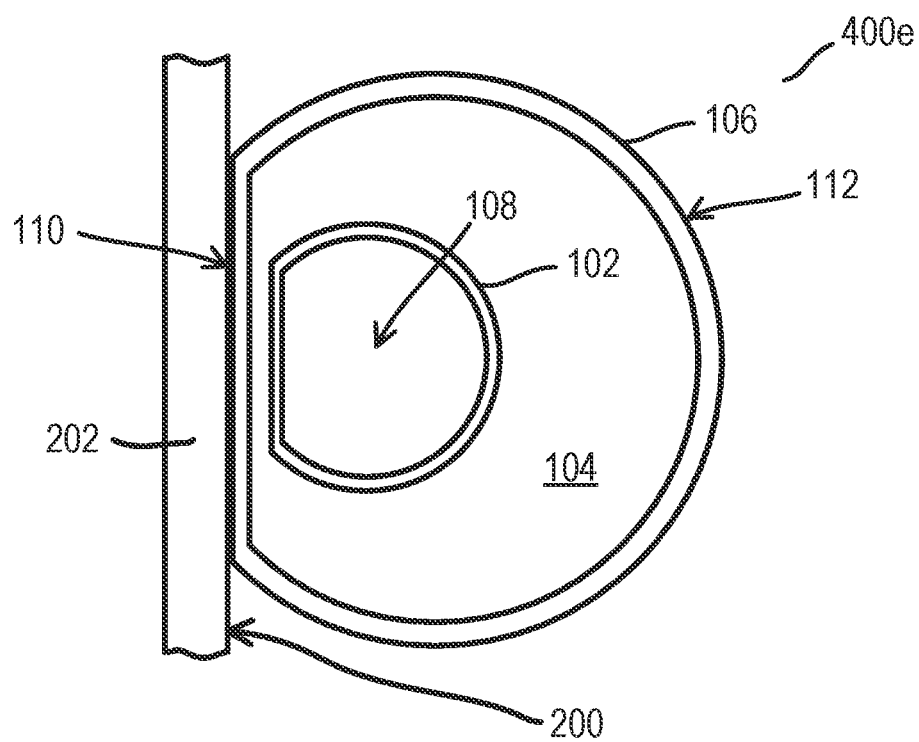
Figure 4F:
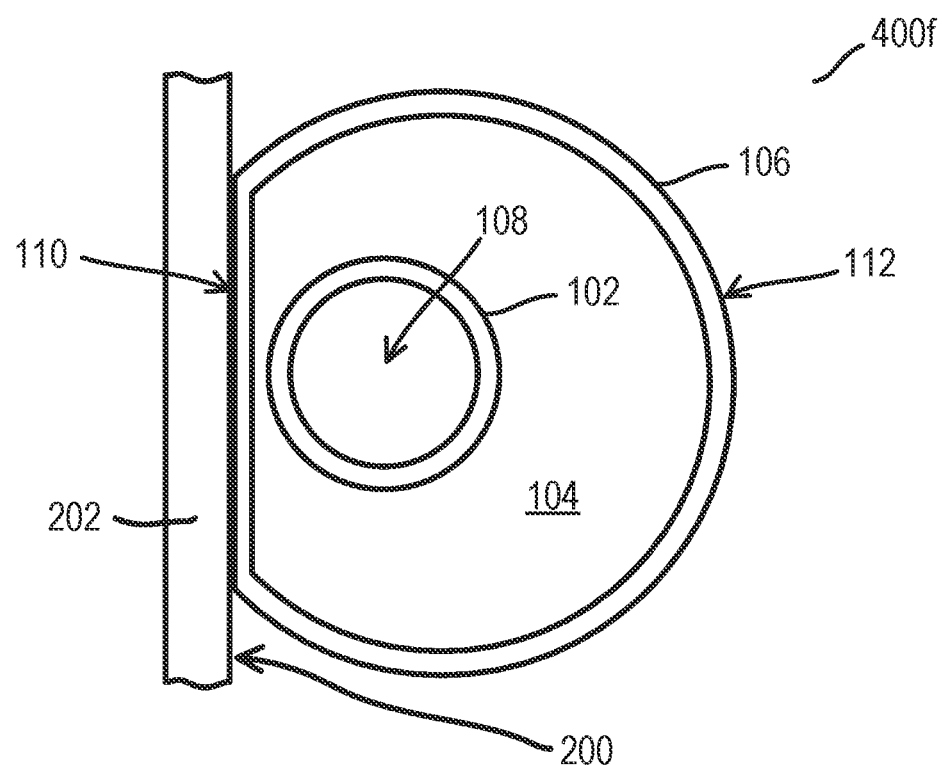

FIGS. 4E-4F illustrate hoses 400e and 400f, respectively. For each of hoses 400e and 400f, the cross-sectional shape of outer cover 106 eliminates parallel elongated edges 114a and 114b of from the D-shaped cross-sectional shape, and curved edge 112 couples directly to opposing ends of elongated edge 110. The cross-sectional shape of hoses 400e and 400f resembles a partial circle with a flat edge (elongated edge 110), or a bulbous D-shape. FIG. 4E illustrates an example hose 400e in which inner hose 102 has a matching cross-sectional shape to the cross-sectional shape of outer cover 106. FIG. 4F illustrates an example hose 400f in which inner hose 102 has a different cross-sectional shape (circular in the illustrated example) than the cross-sectional shape of outer cover 106.

Figure 4G:
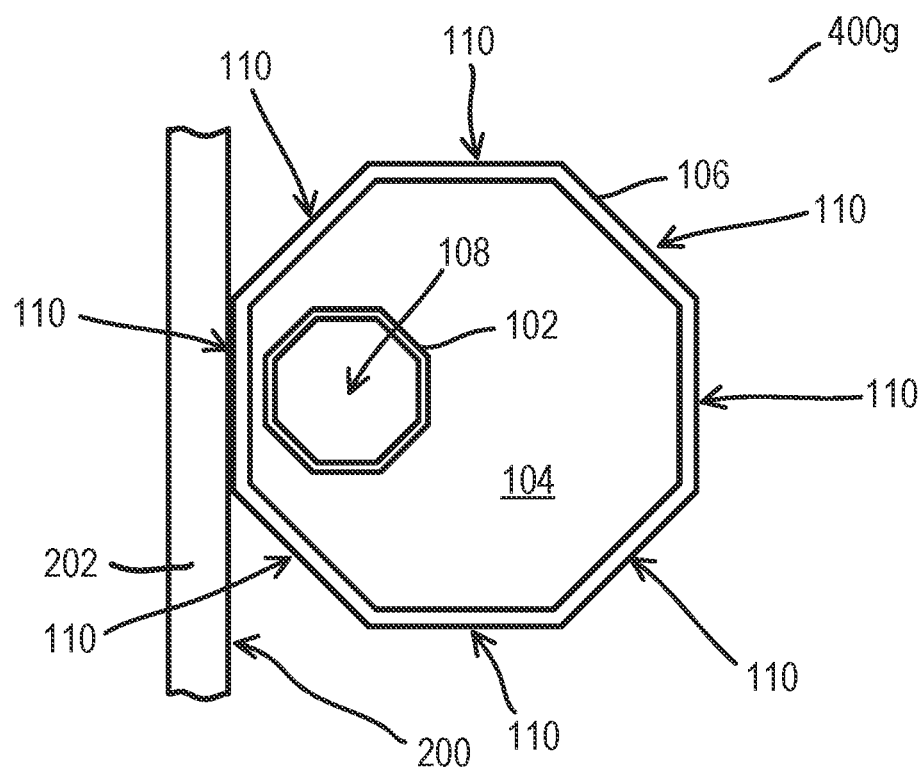
Figure 4H:
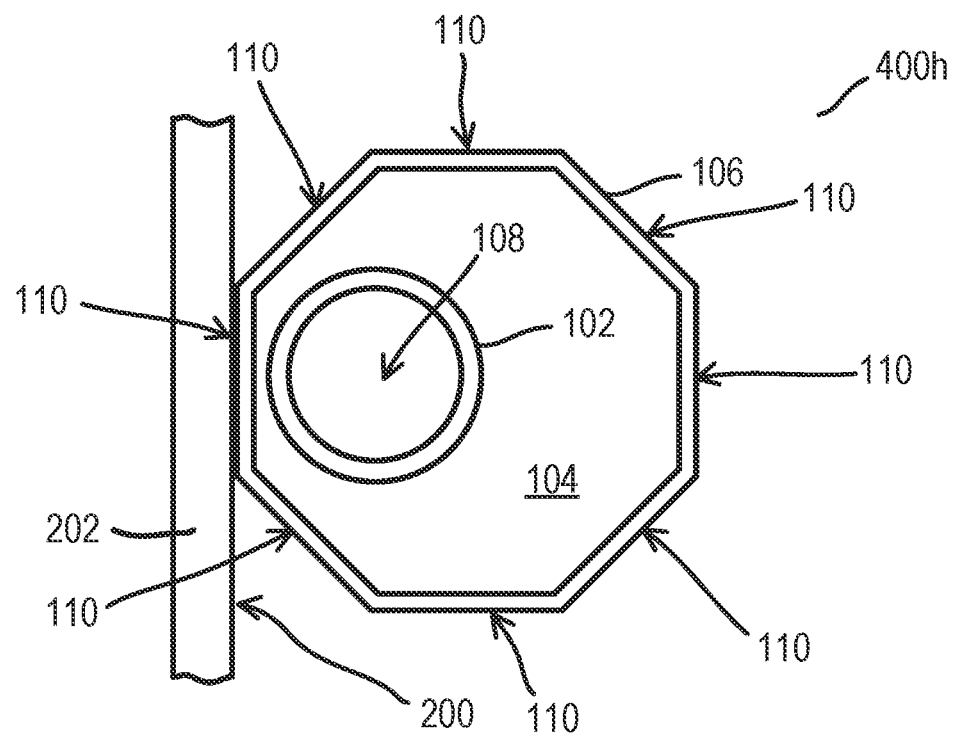

FIGS. 4G-4H illustrate hoses 400g and 400h, respectively. For each of hoses 400g and 400h, the cross-sectional shape of the outer cover 106 includes multiple elongated edges 110. In this particular example, the cross-sectional shape of hoses 400g and 400h resembles a hexagon. FIG. 4G illustrates an example hose 400g in which inner hose 102 has a matching cross-sectional shape to the cross-sectional shape of outer cover 106. FIG. 4H illustrates an example hose 400h in which inner hose 102 has a different cross-sectional shape (circular in the illustrated example) than the cross-sectional shape of outer cover 106.

FIGS. 5A-5D illustrate cross-sectional views of an example hose during a process 500 for forming and positioning the hose, according to certain embodiments. For example, process 500 may be used to form hose 100 or any of the other example hoses described herein.

Figure 5A:
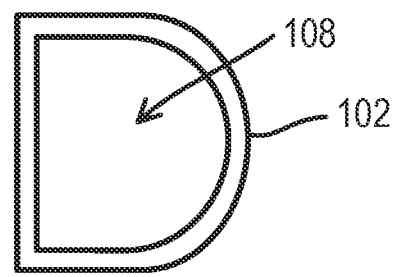
FIGS. 5A-5D illustrate cross-sectional views of an example hose during a process for forming and positioning the hose, according to certain embodiments.
Figure 5B:
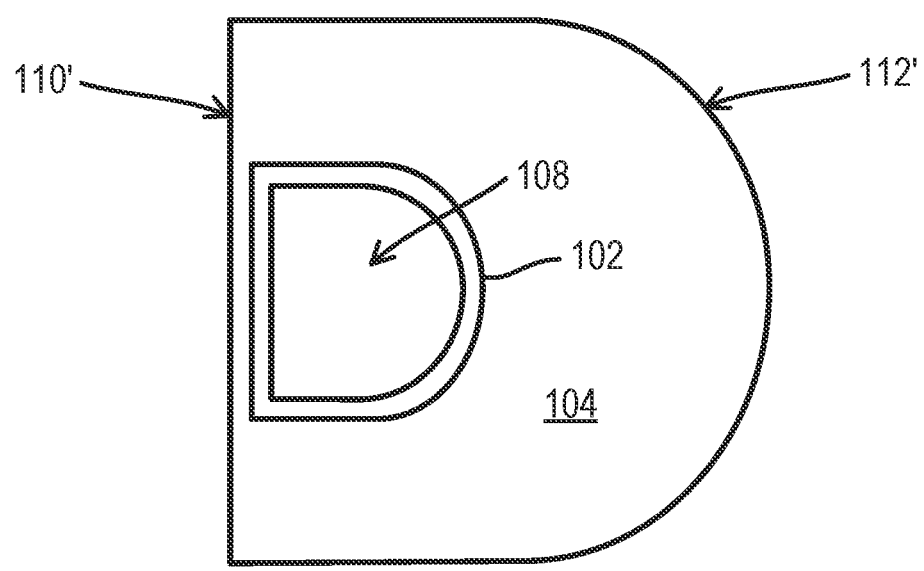
Figure 5C:
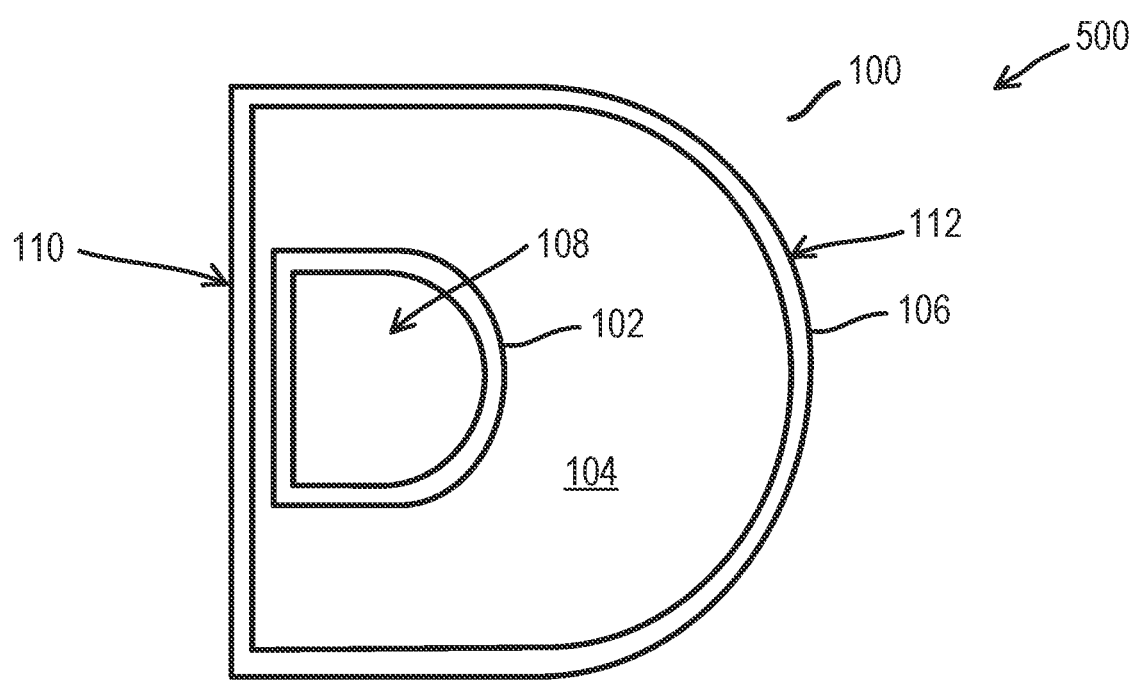
Figure 5D:
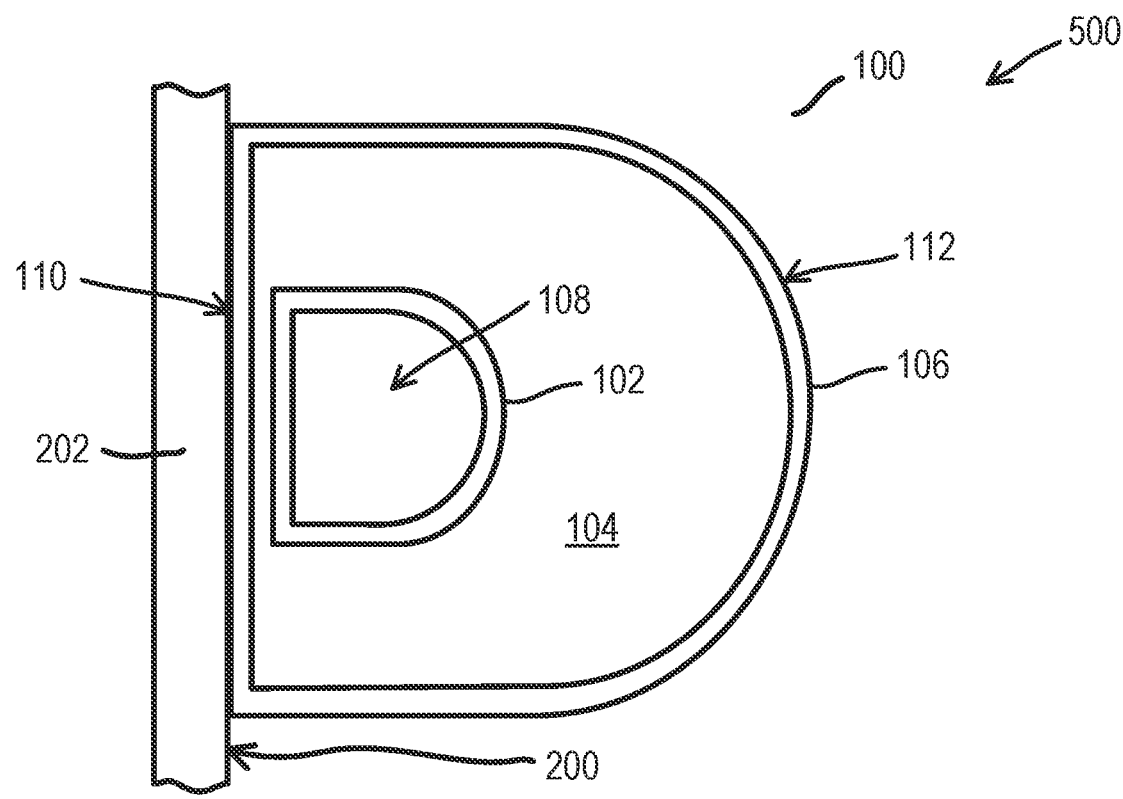
Figure 6:
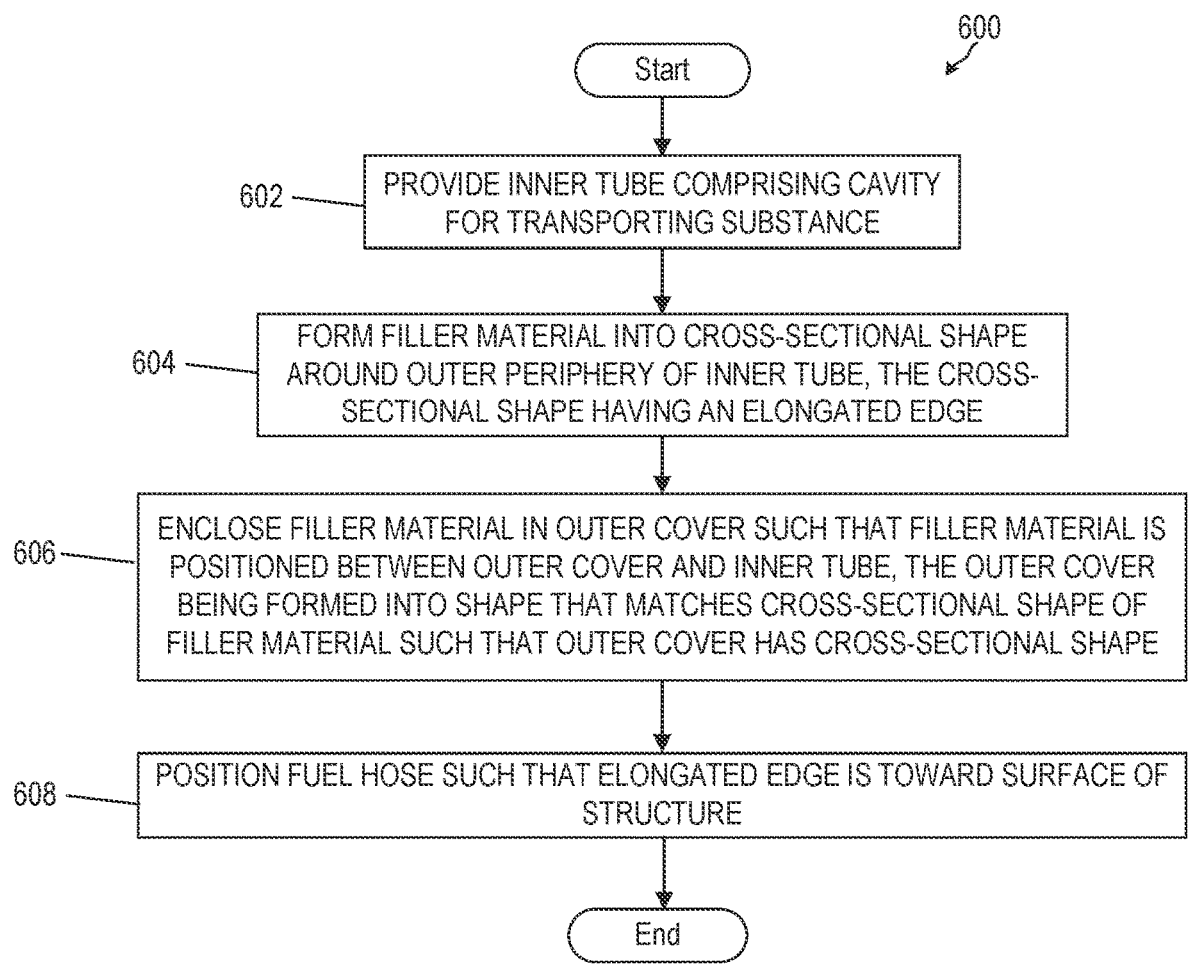
FIG. 6 illustrates an example method for forming and positioning a hose, according to certain embodiments.

FIG. 6 illustrates an example method 600 for forming and positioning a hose, according to certain embodiments. For example, method 600 may be used to form hose 100 or any of the other example hoses described herein. Method 600 of FIG. 6 is described in connection with process 500 of FIGS. 5A-5D.

At block 602 of FIG. 6, and as shown in FIG. 5A (in a cross-sectional view), an inner tube 102 is provided. Inner tube 102 includes cavity 108 for transporting a substance. In certain embodiments, inner tube 102 is purchased from or otherwise received from a third party. Alternatively, providing inner tube 102 may include manufacturing or otherwise forming inner tube 102. If appropriate, inner tube 102 may be cut/formed into the desired length prior to further processing (or may come in the desired length), or may be cut/formed into the desired length at a subsequent processing stage. The cross-sectional shape of inner tube 102 may be any suitable shape, according to particular needs. For example, the cross-sectional shape of inner tube 102 could be D-shaped, ovular, circular, square, hexagonal, or any other suitable shape. Furthermore, the cross-sectional shape of inner tube 102 may be the same as or different than a cross-sectional shape into which filler material 104 and outer cover 106 will be formed.

This disclosure contemplates forming inner tube 102 in any suitable manner, examples of which are described below. The particular technique used to form inner tube 102 may depend on the desired shape (e.g., cross-sectional shape and/or length) for inner tube 102 and performance requirements. Such performance requirements may include consideration of the substance that will be transported within cavity 108 of inner tube 102 and/or the material of filler material 104 (or any applicable intervening layers).

In certain embodiments, forming inner tube 102 includes extruding a polymer material into a polymer tube having a target cross-sectional shape and coupling a reinforcement material to the tube to form inner tube 102, inner tube 102 including the extruded tube and the reinforcement material. As just one example, the extrusion process may include feeding the desired material of inner tube 102 (e.g., a polymer material) through an extrusion die, for example, that results in an output having the desired cross-sectional shape for inner tube 102. The reinforcement material may then be applied over the extruded tube, such as by over-braiding the extruded tube with a braiding reinforcement material, to form inner tube 102.

In certain embodiments, forming inner tube 102 includes layering multiple polymer (or other) films on a mandrel with one or more reinforcement layers, such as one or more fiber reinforcement layers. For example, a mandrel may be formed having a cross-sectional shape that matches the target cross-sectional shape of inner tube 102. As particular examples, the mandrel may have a D-shaped cross-sectional shape, an ovular cross-sectional shape, a circular cross-sectional shape, or any other suitable shape. The mandrel may be heated to a suitable temperature for the material(s) being formed into inner tube 102, the mandrel may be spun at a suitable rotations per minute (RPMs) (e.g., using a lathe or other suitable apparatus), and the material(s) may be speed passed over the spinning mandrel to form the materials into inner tube 102 having the desired cross-sectional shape. The formed inner tube 102 may be cooled or allowed to cool before removing the formed inner tube 102 from the mandrel, which may allow the formed inner tube 102 to hold its shape.

In certain embodiments, inner tube 102 includes a fuel resistant fiber such as a prepreg, which may be a reinforcing fabric that has been pre-impregnated with a resin system. The prepreg may be heat-activated to form a fuel resistant coating. Alternatively, a thermosetting polymer, commonly referred to as a thermoset, may be used.

In certain embodiments in which a reinforcement material is used in connection with inner tube 102 and in which the reinforcement material is braiding, the braiding material may be applied using a hose braider.

Although inner tube 102 is described as including particular content or being formed in particular manners, this disclosure contemplates inner tube 102 including any suitable content and formed in any suitable manner.

At block 604 of FIG. 6, and as shown in FIG. 5B, filler material 104 is formed into a cross-sectional shape around an outer periphery of inner tube 102. In certain embodiments, the cross-sectional shape into which filler material 104 is formed has at least one elongated edge 110'. Additionally, in certain embodiments, the cross-sectional shape into which filler material 104 is formed may include at least one curved edge 112', and that curved edge 112' in the illustrated example is opposite elongated edge 110'. As just one example, the cross-sectional shape into which filler material 104 is formed is a D-shape. In certain embodiments, the cross-sectional shape into which filler material 104 is formed and the cross-sectional shape of inner tube 102 (to be formed at a subsequent step in this example) are a same cross-sectional shape; however this disclosure contemplates the cross-sectional shape into which filler material 104 is formed and the cross-sectional shape of inner tube 102 being different cross-sectional shapes. Filler material 104 may be applied around a periphery of inner tube 102 until a target loading of filler material is reached in each direction, consistent with the cross-sectional shape being formed.

Filler material 104 may be formed into the cross-sectional shape in any suitable manner, examples of which are described below. The particular technique used to form filler material into the cross-sectional shape may depend on the desired shape (e.g., cross-sectional shape and/or length) for filler material 104 and performance requirements. Such performance requirements may include consideration of the ability of filler material 104 to perform a (e.g., self-heal and/or self-seal) in a formed hose 100, weight considerations, or other suitable properties.

In certain embodiments, forming filler material 104 into the cross-sectional shape around the outer periphery of inner tube 102 includes layering, by hand, filler material 104 around the outer periphery of inner tube 102 into the cross-sectional shape. In certain embodiments, forming filler material 104 into the cross-sectional shape around the outer surface of inner tube 102 includes spray-coating filler material 104 around the outer periphery of inner tube 102 into the cross-sectional shape. For example, coatings of filler material 104 may be applied around the outer periphery of inner tube 102 by spraying, using an air-brush, in substantially uniform strokes, filler material 104 around the outer surface of inner tube 102 (or an intervening layer, if applicable). As particular examples, the air brush may be a hand-held spray brush or may be part of a machine, such as a slot die coater.

In either case, filler material 104 may be layered and built up around inner tube 102 while leaving the flat side of the D-shape exposed with less filler material 104 (and possibly even little to no filler material 104) filler material 104 than other portions of hose 100 (e.g., the curved portion of the D-shaped cross-section).

In certain embodiments, filler material 104 includes a textile-based filler material, and forming filler material 104 into the cross-sectional shape around the outer periphery of inner tube 102 includes layering, by hand, the textile-based material around the outer periphery of inner tube 102 into the cross-sectional shape. As just one example, the textile-based material may be a self-sealing fabric and may be formed from ultra-high molecular weight polyethylene. The textile-based material may be layered and built up around inner tube 102 while leaving the flat side of the D-shape exposed with less filler material 104 (and possibly even little to no filler material 104) filler material 104 than other portions of hose 100 (e.g., the curved portion of the D-shaped cross-section).

In certain embodiments forming filler material 104 into the cross-sectional shape around the outer periphery of inner tube 102 includes positioning inner tube 102 inside a mold that has the target cross-sectional shape for filler material 104. Filler material 104 is then deposited in the mold in a gap between the mold and an exterior surface of inner tube 102. The filler material 104 is allowed to set and then is removed from the mold.

In certain embodiments forming filler material 104 into the cross-sectional shape around the outer periphery of inner tube 102 is performed using a resin infusion process.

In certain embodiments forming filler material 104 into the cross-sectional shape around the outer periphery of inner tube 102 includes applying an excessive amount filler material 104 around the outer periphery of inner tube and extruding filler material 104 around the outer periphery of inner tube 102 into the cross-sectional shape. For example, the excessive amount of filler material 104 may be more filler material 104, outward from the outer surface of inner tube 102 (the surface of inner tube 102 that faces away from cavity 108) than is needed to form filler material 104 into the cross-sectional shape. As just one example, the extrusion process may include feeding the inner tube 102 with the excessive amount of filler material 104 around inner tube 102 through an extrusion die, for example, that results in an output having the desired cross-sectional shape for filler material 104.

Although filler material 104 is described as including particular content or being formed in particular manners, this disclosure contemplates filler material 104 including any suitable content and formed in any suitable manner.

At block 606 of FIG. 6, and as shown in FIG. 5C, filler material 104 may be enclosed in outer cover 106 such that filler material 104 is positioned between outer cover 106 and inner tube 102. Outer cover 106 may be formed into a shape that matches the cross-sectional shape of filler material 104 such that outer cover 102 has the cross-sectional shape of filler material 104. In certain embodiments, the cross-sectional shape into which outer cover 106 is formed has at least one elongated edge. As just one example, the cross-sectional shape into which outer cover 106 is formed is a D-shape. In certain embodiments, the cross-sectional shape into which outer cover 106 is formed and the cross-sectional shape of inner tube 102 are a same cross-sectional shape; however this disclosure contemplates the cross-sectional shape into which outer cover 106 is formed and the cross-sectional shape of inner tube 102 being different cross-sectional shapes.

Outer cover 106 may be formed into the cross-sectional shape in any suitable manner, examples of which are described below. The particular technique used to form outer cover 106 may depend on the desired shape (e.g., cross-sectional shape and/or length) for outer cover 106 and performance requirements. Such performance requirements may include consideration of the substance that will be transported within cavity 108 of inner tube 102, the material of filler material 104 (or any applicable intervening layers), and/or the environment in which hose 100 will operate.

In certain embodiments, outer cover 106 includes a braiding layer and enclosing filler material 104 in outer cover 106 such that filler material 104 is positioned between outer cover 106 and inner tube 102 includes forming the braiding layer around filler material. In certain embodiments, enclosing filler material 104 in outer cover 106 such that filler material 104 is positioned between outer cover 106 and inner tube 102 includes spray-coating at least a portion of the material of outer cover 106 around filler material 104. In certain embodiments, enclosing filler material 104 in outer cover 106 such that filler material 104 is positioned between outer cover 106 and inner tube 102 includes vacuum-forming at least a portion of the material of outer cover 106 around filler material 104. In certain embodiments, enclosing filler material 104 in outer cover 106 such that filler material 104 is positioned between outer cover 106 and inner tube 102 includes dip-coating at least a portion of the material of outer cover 106 around filler material 104.

In certain embodiments, enclosing filler material 104 in outer cover 106 such that filler material 104 is positioned between outer cover 106 and inner tube 102 includes applying an excessive amount of at least a portion of the material of outer cover 106 around filler material 104 and extruding the material of outer cover 106 around filler material 104 into the cross-sectional shape around of outer cover 106 around filler material 104. As just one example, the extrusion process may include feeding the hose 100 with the excessive amount of material of outer cover 106 around filler material 104 through an extrusion die, for example, that results in an output having the desired cross-sectional shape for outer cover 106/hose 100.

In certain embodiments, forming outer cover 106 includes extruding a polymer material into the desired a cross-sectional shape of outer cover 106 (or otherwise forming outer cover 106) and coupling a reinforcement material to the outer cover 106 following the extrusion process, outer cover 106 including the extruded tube and the reinforcement material. The reinforcement material may be applied over the extruded portion of outer cover 106 using any suitable technique, such as by over-braiding the extruded portion of outer cover 106 with a braiding reinforcement material.

In certain embodiments in which a reinforcement material is used in connection with outer cover 106 and in which the reinforcement material is braiding, the braiding material may be applied using a hose braider.

Although outer cover 106 is described as including particular content or being formed in particular manners, this disclosure contemplates outer cover 106 including any suitable content and formed in any suitable manner.

At this state of process 500 and method 600, hose 100 may be considered formed and includes inner tube 102, filler material 104, and outer cover 106. Of course, additional steps may be performed such as any additional treatment to outer cover 106, any additional application of further layers around outer cover 106, and/or any cutting of hose 100 to a desired length.

At block 608 of FIG. 6, and as shown in FIG. 5D, hose 100 may be positioned against a surface 200 of a structure 202. The surface 200 could be the surface of a vehicle or other type of machine for example. In certain embodiments, ends of hose 100 may be coupled to a source and a destination, using any suitable type of coupling apparatuses, if appropriate. In certain embodiments, an elongated edge 110 of a hose 100 may be positioned against surface 200 of structure 202, which may allow the majority of filler material 104 of hose 100 to be oriented toward a potential threat, if desired for a particular application.

Process 500 and method 600 may be repeated to form additional hoses 100.

The hoses described herein may be used for a variety of applications and substances. In certain embodiments, a hose according to this disclosure may be used in a machine, such as a vehicle. In certain embodiments, the vehicle is a rotorcraft, and the substance is fuel, water, oil, coolant, or another suitable substance that may be transported from one location on the rotorcraft to another. In the particular case of fuel, the hose may transport fuel from the fuel tank to an engine or propulsion unit of the rotorcraft.

A hose according to this disclosure, such as a D-shaped hose, may be a drop-in replacement for conventional circular hoses. In certain embodiments, standard fittings may be added to the hose and connected to the vehicle and/or components of the vehicle. The flat side of the hose (e.g., hose 100) would be positioned toward and/or against a surface of the vehicle with the-self-sealing curved side facing outward, in a direction toward a potential threat. As a result, the hose would have a smaller diameter and lower weight at the same protection level or it could be made larger to increase the protection level.

A hose according to this disclosure may be used in a military application (e.g., in the tactical market) where a threat of gunfire and shrapnel are present. Additionally or alternatively, a hose according to this disclosure could be used in any suitable application. For example, a hose according to this disclosure could be applied to space and or underwater exploration where a self-sealing/self-healing material in the D-shaped portion of the hose could be modified or replaced to meet specific mission requirements. These could include insulation, further pressure-vacuum performance, or other performance requirements. The D-shaped hose may allow increased overall performance outward from the vehicle (or other structure) through either reduced weight and diameter or through increased volume of protective material by taking advantage of the reduced overall diameter against the engine.

Figure 7A:
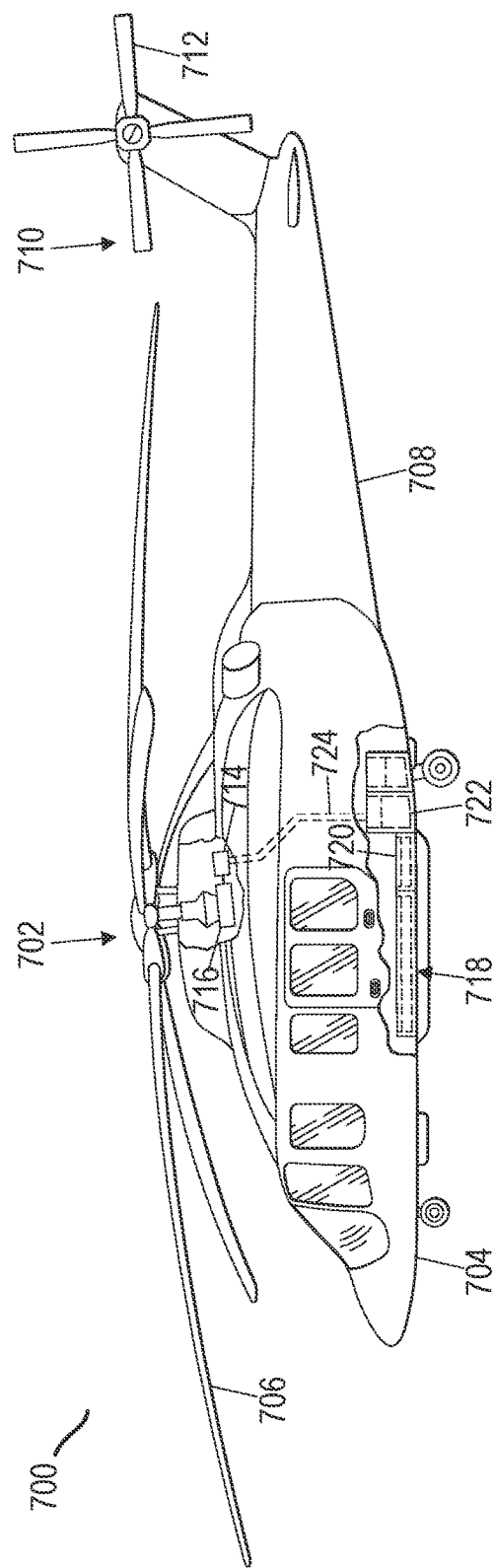
FIGS. 7A-7B are schematic views of a rotorcraft, according to certain embodiments.
Figure 7B:
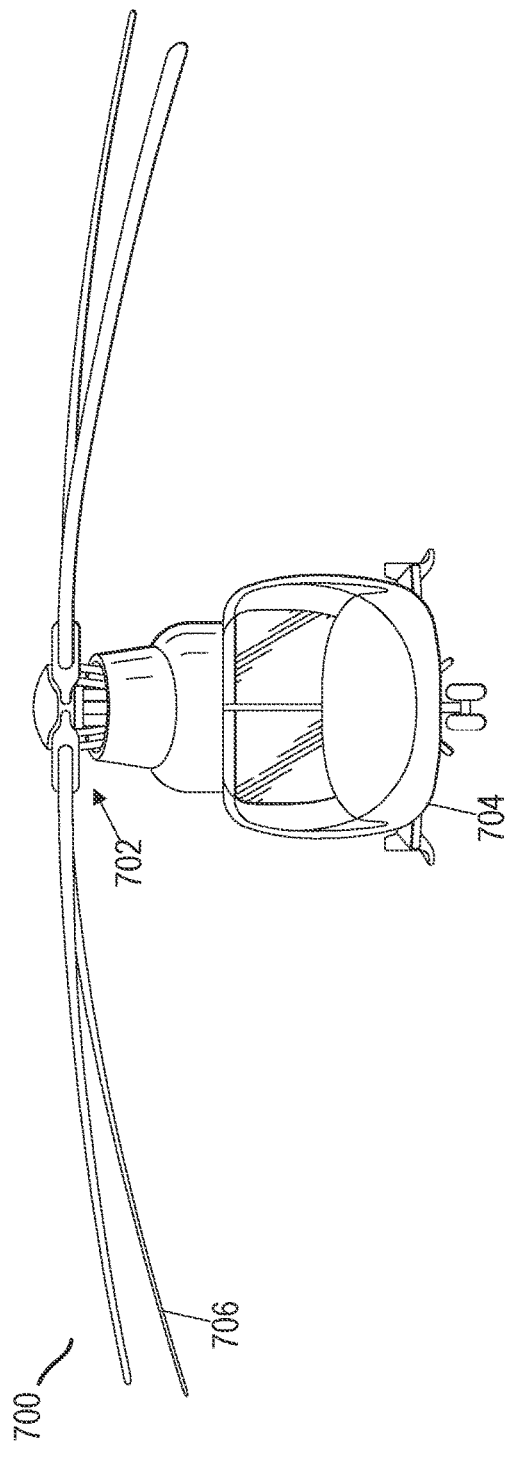

FIGS. 7A-7B are schematic views of a rotorcraft 700, according to certain embodiments. Rotorcraft 700 includes a main rotor hub assembly 702, which is rotatable relative to a fuselage 704 of rotorcraft 700. Main rotor hub assembly 702 includes main rotor blades 706. The pitch of main rotor blades 706 can be collectively and/or cyclically manipulated to selectively control direction, thrust, and lift of rotorcraft 700. A tailboom 708 extends from fuselage 704, and a tail rotor hub assembly 710 is attached to an aft portion of tailboom 708. Tail rotor hub assembly 710 includes a tail rotor 712, which is rotatable relative to tailboom 708. Tail rotor 712 may collectively provide thrust in the opposite direction as the rotation of main rotor hub assembly 702, so as to counter torque effects created by main rotor blades 706.

The components of rotorcraft 700 (e.g., main rotor hub assembly 702 and tail rotor hub assembly 710) are powered by one or more engines 714. For example, engines 714 may power main rotor hub assembly 702 via a main rotor gearbox 716. Engines 714 may also power other components, such as alternators, cooling units, or the like. Rotorcraft 700 further includes a fuel system 718, which includes a fuel cell assembly 720. Fuel cell assembly 720 may be located in a lower portion of fuselage 704. Fuel cell assembly 720 is coupled to fuselage 704, and may be fully or partially integral with fuselage 704, or may be an independent component which is secured to fuselage 704. Fuel cell assembly 720 may be located elsewhere in rotorcraft 700. Fuel cell assembly 720 includes one or more fuel cells 722 for storing fuel. The fuel contained in fuel cells 722 is used as an energy source to power various systems of rotorcraft 700 such as main rotor hub assembly 702 and tail rotor hub assembly 710. Specifically, fuel system 718 is operable to deliver fuel stored in fuel cells 722 to engines 714. Fuel cells 722 may be fluidly coupled to components of rotorcraft 700, such as engines 714, with one or more fuel lines 724. Fuel lines 724 may be implemented as a hose according to certain embodiments of this application. For example, fuel lines 724 could be implemented as hose 100 (including variants 100' and 100"), hose 300, and hoses 400a-400h.

Embodiments of this disclosure may provide none, some, or all of the following technical advantages. Furthermore, other advantages may be described in or understood from this disclosure.

Certain embodiments provide a flexible, ballistically-tolerant, self-sealing (or self-healing) hose that is D-shaped, which may maximize the amount of self-sealing (or self-healing) material toward a threat. Certain embodiments provide a hose that is able to provide one or more of these advantages, all while still performing the basic function of a hose (e.g., to allow one or more substance to pass through the hose and/or other suitable functions).

In certain embodiments, the materials of the hose may be flexible; however, this disclosure contemplates the materials of the hose being rigid or flexible, depending on whether the hose itself is designed to be rigid or flexible.

By incorporating a filler material that is able to self-seal and/or self-heal, embodiments of this disclosure provide a hose that is able to self-seal and/or self-heal, regardless of the reason that a possible opening may form in the hose.

Certain embodiments provide a hose that is able to perform the core functions of transporting a substance (e.g., fluid) from one part of a structure (e.g., a vehicle) to another while being exposed to the environment and potential ballistic damage. Embodiments of this disclosure may provide a hose that is ballistically tolerant. For example, by incorporating a filler material that is able to self-seal and/or self-heal, this disclosure may provide a hose that is ballistically tolerant.

In certain embodiments, a D-shaped cross-sectional shape of the hose may allow maximizing the amount of filler material (e.g., self-sealing and/or self-healing material) toward a potential threat.

In certain embodiments, providing a hose having a cross-sectional shape that incorporates an elongated edge (e.g., a D-shaped cross-sectional shape) may facilitate aligning of the hose toward and possibly against a surface of a structure (e.g., a surface of a vehicle) during installation. Furthermore, the elongated edge of the cross-sectional shape may help maintain the hose in that alignment with the elongated edge by impeding rotation of the hose out of an orientation in which the majority of the filler material (e.g., the self-sealing and/or self-healing material) is positioned toward a potential threat.

Certain embodiments allow a thinner and potentially lighter hose (e.g., fuel hose) to be manufactured by allowing the perimeter of the hose to be decreased (along with the diameter) while still allowing the same or possible more filler material (e.g., a self-sealing and/or self-healing material) to be positioned toward a threat, thereby providing a thinner and lighter hose without sacrificing durability as to the threat (e.g., ballistic performance). In certain embodiments, even though an outer perimeter/diameter of the hose may be reduced, a cross-sectional area/volume of a cavity of an inner tube of the hose may be maintained relative to a hose in which the amount of filler material has not been reduced and/or the inner tube has not been positioned closer to an elongated edge of the hose.

Example embodiments of this disclosure are summarized here. Other embodiments can also be understood from the entirety of the specification as well as the claims filed herein.

Example 1. A hose includes an inner tube, a filler material, and an outer cover. The inner tube has a cross-sectional shape and includes a cavity for transporting a substance. The filler material is provided around an outer periphery of the inner tube. The filler material includes a self-sealing material or a self-healing material. The outer cover is provided around an outer periphery of the filler material such that the filler material is between the outer cover and the inner tube. The outer cover has a D-shaped cross-sectional shape.

Example 2. The hose of Example 1, where the outer cover includes a first elongated edge and a curved edge opposite the first elongated edge.

Example 3. The hose of any one of Examples 1 and 2, where the inner tube is positioned closer to the first elongated edge of the outer cover than to the curved edge of the outer cover such that a greater amount of filler material is positioned between the inner tube and the curved edge of the outer cover than between the inner tube and the first elongated edge of the outer cover.

Example 4. The hose of any one of Examples 1-3, where the outer cover further includes a second elongated edge extending from a first end of the first elongated edge and a third elongated edge extending from a second end of the first elongated edge, the curved edge coupling the second elongated edge and the third elongated edge.

Example 5. The hose of any one of Examples 1-4, where the inner tube includes a reinforcement layer and a flexible polymer.

Example 6. The hose of any one of Examples 1-5, where the cross-sectional shape of the inner tube is a D-shape.

Example 7. The hose of any one of Examples 1-5, where the cross-sectional shape of the inner tube is ovular or circular.

Example 8. The hose of any one of Examples Claim 1-7, where the outer cover includes a film barrier, an outer coating, or a braided layer.

Example 9: A method for forming a hose includes providing an inner tube comprising a cavity for transporting a substance and forming a filler material into a first cross-sectional shape around an outer periphery of the inner tube. The first cross-sectional shape has at least one elongated edge. The method includes enclosing the filler material in an outer cover such that the filler material is positioned between the outer cover and the inner tube. The outer cover is formed into a shape that matches the first cross-sectional shape of the filler material such that the outer cover has the first cross-sectional shape.

Example 10: The method of Example 9, where providing the inner tube includes forming the inner tube, and forming the inner tube includes extruding a polymer material into a tube having a second cross-sectional shape and coupling a reinforcement material to the tube such that the inner tube comprises the tube and the reinforcement material.

Example 11. The method of Example 9, where providing the inner tube includes forming the inner tube, forming the inner tube includes layering multiple polymer films on a mandrel with one or more reinforcement layers.

Example 12. The method of any one of Examples 9-11, where the first cross-sectional shape and a second cross-sectional shape of the inner tube are a same cross-sectional shape.

Example 13. The method of any one of Examples 9-12, where the first cross-sectional shape is a D-shape.

Example 14. The method of any one of Examples 9-13, where forming the filler material into the first cross-sectional shape around the outer periphery of the inner tube includes layering, by hand, the filler material around the outer periphery of the inner tube into the first cross-sectional shape.

Example 15. The method of any one of Examples 9-13, where forming the filler material into the first cross-sectional shape around the outer surface of the inner tube includes spray-coating the filler material around the outer periphery of the inner tube into the first cross-sectional shape.

Example 16. The method of any one of Examples 9-13, where forming the filler material into the first cross-sectional shape around the outer periphery of the inner tube includes applying an excessive amount the filler material around the outer periphery of the inner tube and extruding the filler material around the outer periphery of the inner tube into the first cross-sectional shape around the outer periphery of the inner tube.

Example 17. The method of any one of Examples 9-16, where enclosing the filler material in the outer cover such that the filler material is positioned between the outer cover and the inner tube includes: forming a braiding layer around the filler material, the outer cover comprising the braiding layer; spray-coating the outer cover around the filler material; vacuum-forming the outer cover around the filler material; dip-coating the outer cover around the filler material; or applying an excessive amount of an outer cover material around the filler material and extruding the outer cover material around the filler material into the first cross-sectional shape around the filler material.

Example 18. A machine includes a surface configured to be oriented toward a potential threat and a hose. The hose includes an inner tube, a filler material, and an outer cover. The inner tube includes a cavity for transporting a substance. The filler material is provided around an outer periphery of the inner tube and includes a self-sealing material or a self-healing material. The outer cover is provided around an outer periphery of the filler material such that the filler material is between the outer cover and the inner tube. The outer cover has a cross-sectional shape that includes at least one flat edge. A thickness of the filler material between the inner tube and the at least one flat edge of the outer cover is less than a thickness of the filler material between the inner tube and at least one other edge of the outer cover. The at least one flat edge is positioned toward a portion of the surface such that a greater amount of filler material is configured to be oriented toward the potential threat.

Example 19. The machine of Example 17, where the cross-sectional shape of the outer cover and a cross-sectional shape of the inner tube are substantially a same cross-sectional shape.

Example 20. The machine of any one of Examples 18-19, where the cross-sectional shape of the outer cover is a D-shape.

Illustrative embodiments of the system and method of the present disclosure are described above. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for forming a hose, the method comprising:
   providing an inner tube comprising a cavity for transporting a substance;
   forming a filler material into a first cross-sectional shape around an outer periphery of the inner tube, the first cross-sectional shape having at least one elongated edge; and
   enclosing the filler material in an outer cover such that the filler material is positioned between the outer cover and the inner tube, the outer cover being formed into a shape that matches the first cross-sectional shape of the filler material such that the outer cover has the first cross-sectional shape, a thickness of the filler material between the inner tube and the at least one elongated edge of the outer cover being less than a thickness of the filler material between the inner tube and at least one other edge of the outer cover.

2. The method of claim 1, wherein providing the inner tube comprises forming the inner tube, forming the inner tube comprising:
   extruding a polymer material into a tube having a second cross-sectional shape; and
   coupling a reinforcement material to the tube such that the inner tube comprises the tube and the reinforcement material.

3. The method of claim 1, wherein providing the inner tube comprises forming the inner tube, forming the inner tube comprising layering multiple polymer films on a mandrel with one or more reinforcement layers.

4. The method of claim 1, wherein the first cross-sectional shape and a second cross-sectional shape of the inner tube are a same cross-sectional shape.

5. The method of claim 1, wherein the first cross-sectional shape is a D-shape.

6. The method of claim 1, wherein forming the filler material into the first cross-sectional shape around the outer periphery of the inner tube comprises layering, by hand, the filler material around the outer periphery of the inner tube into the first cross-sectional shape.

7. The method of claim 1, wherein forming the filler material into the first cross-sectional shape around the outer periphery of the inner tube comprises spray-coating the filler material around the outer periphery of the inner tube into the first cross-sectional shape.

8. The method of claim 1, wherein forming the filler material into the first cross-sectional shape around the outer periphery of the inner tube comprises:
   applying an excessive amount of the filler material around the outer periphery of the inner tube; and
   extruding the filler material around the outer periphery of the inner tube into the first cross-sectional shape around the outer periphery of the inner tube.

9. The method of claim 1, wherein enclosing the filler material in the outer cover such that the filler material is positioned between the outer cover and the inner tube comprises:
   forming a braiding layer around the filler material, the outer cover comprising the braiding layer;
   spray-coating the outer cover around the filler material;
   vacuum-forming the outer cover around the filler material;
   dip-coating the outer cover around the filler material; or
   applying an excessive amount of an outer cover material around the filler material and extruding the outer cover material around the filler material into the first cross-sectional shape around the filler material.

10. A method for forming a hose, comprising:
   providing an inner tube having a cross-sectional shape, the inner tube comprising a cavity for transporting a substance;
   forming a filler material into a D-shaped cross-sectional shape around an outer periphery of the inner tube, the filler material comprising a self-sealing material or a self-healing material; and
   enclosing the filler material in an outer cover such that the filler material is between the outer cover and the inner tube, the outer cover being formed into the D-shaped cross-sectional shape, the D-shaped cross-sectional shape comprising a first elongated edge, the inner tube being positioned such that a thickness of the filler material between the inner tube and the first elongated edge of the outer cover is less than a thickness of the filler material between the inner tube and at least one other edge of the outer cover.

11. The method of claim 10, wherein providing the inner tube comprises forming the inner tube, forming the inner tube comprising:
   extruding a polymer material into a tube having a second cross-sectional shape; and
   coupling a reinforcement material to the tube such that the inner tube comprises the tube and the reinforcement material.

12. The method of claim 10, wherein providing the inner tube comprises forming the inner tube, forming the inner tube comprising layering multiple polymer films on a mandrel with one or more reinforcement layers.

13. The method of claim 10, wherein forming the filler material into the D-shaped cross-sectional shape around the outer periphery of the inner tube comprises layering, by hand, the filler material around the outer periphery of the inner tube into the D-shaped cross-sectional shape.

14. The method of claim 10, wherein forming the filler material into the D-shaped cross-sectional shape around the outer periphery of the inner tube comprises spray-coating the filler material around the outer periphery of the inner tube into the D-shaped cross-sectional shape.

15. The method of claim 10, wherein forming the filler material into the D-shaped cross-sectional shape around the outer periphery of the inner tube comprises:
   applying an excessive amount the filler material around the outer periphery of the inner tube; and
   extruding the filler material around the outer periphery of the inner tube into the D-shaped cross-sectional shape around the outer periphery of the inner tube.

16. The method of claim 10, wherein enclosing the filler material in the outer cover such that the filler material is positioned between the outer cover and the inner tube comprises:
   forming a braiding layer around the filler material, the outer cover comprising the braiding layer;
   spray-coating the outer cover around the filler material;
   vacuum-forming the outer cover around the filler material;
   dip-coating the outer cover around the filler material; or
   applying an excessive amount of an outer cover material around the filler material and extruding the outer cover material around the filler material into the D-shaped cross-sectional shape around the filler material.

17. The method of claim 10, wherein the cross-sectional shape of the inner tube is a D-shape.

18. The method of claim 10, wherein the cross-sectional shape of the inner tube is ovular or circular.

19. A method, comprising:
   receiving a hose that comprises:
      an inner tube comprising a cavity for transporting a substance;
      a filler material provided around an outer periphery of the inner tube, the filler material comprising a self-sealing material or a self-healing material;
      an outer cover provided around an outer periphery of the filler material such that the filler material is between the outer cover and the inner tube, the outer cover having a cross-sectional shape that comprises one or more flat edges, a thickness of the filler material between the inner tube and at least one flat edge of the one or more flat edges of the outer cover being less than a thickness of the filler material between the inner tube and at least one other edge of the outer cover; and
   positioning the at least one flat edge of the hose toward a surface of a machine such that a greater amount of filler material is configured to be oriented toward a potential threat.

20. The method of claim 19, wherein the cross-sectional shape of the outer cover and a cross-sectional shape of the inner tube are a same cross-sectional shape.

* * * * *